United States Patent
Schena et al.

(10) Patent No.: US 7,944,433 B2
(45) Date of Patent: *May 17, 2011

(54) FORCE FEEDBACK DEVICE INCLUDING ACTUATOR WITH MOVING MAGNET

(75) Inventors: Bruce M. Schena, Menlo Park, CA (US); Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 10/794,053

(22) Filed: Mar. 8, 2004

(65) Prior Publication Data

US 2004/0227727 A1  Nov. 18, 2004

Related U.S. Application Data

(60) Continuation of application No. 09/431,383, filed on Nov. 1, 1999, now Pat. No. 6,704,001, and a continuation-in-part of application No. 09/140,717, filed on Aug. 26, 1998, now Pat. No. 6,201,533, which is a division of application No. 08/560,091, filed on Nov. 17, 1995, now Pat. No. 5,805,140.

(60) Provisional application No. 60/107,267, filed on Nov. 4, 1998.

(51) Int. Cl.
*G09G 5/00* (2006.01)
*G06F 3/033* (2006.01)
(52) U.S. Cl. .................................................... 345/161
(58) Field of Classification Search .......... 345/156–158, 345/161, 163, 184; 715/701, 702; 463/30, 463/36–38; 341/20; 74/471 XY; 336/40, 336/117, 130; 273/148 R; 310/12–15, 17, 310/23, 28, 75 R; 335/179, 220, 229

See application file for complete search history.

(56) References Cited

U.S. PATENT DOCUMENTS 2,906,179 A    9/1959  Bower
(Continued)

FOREIGN PATENT DOCUMENTS

DE    196 13 025 A1    9/1997
(Continued)

OTHER PUBLICATIONS

Rosenberg, Louis B. et al., "Perceptual Decomposition of Virtual Haptic Surfaces," IEEE, Oct. 1993.*

(Continued)

*Primary Examiner* — Jeffery A Brier
(74) *Attorney, Agent, or Firm* — Kilpatrick Townsend & Stockton LLP

(57) ABSTRACT

A force feedback interface device is coupled to a host computer that displays a graphical environment, the device including a user manipulatable object physically contacted and moveable by a user. A sensor detects a position of the user object and provides a sensor signal to the host computer, where the sensor signal includes information representative of the position of the user object. An actuator is coupled to the device or user object and outputs a force on the user manipulatable object or a housing of the device. The actuator includes a magnet and a grounded coil, where the magnet moves approximately within a plane with respect to the coil, and wherein a current is provided in the coil to generate the force. Other embodiments provide a magnet that moves in a linear degree of freedom within a coil housing, or provide an at least partially spherical magnet providing rotary degrees of freedom to a user manipulatable object coupled to the magnet. One embodiment includes a planar frame support mechanism.

9 Claims, 7 Drawing Sheets

U.S. PATENT DOCUMENTS

| | | |
|---|---|---|
| 3,157,853 A | 11/1964 | Hirsch |
| 3,220,121 A | 11/1965 | Cutler |
| 3,490,059 A | 1/1970 | Paulsen et al. |
| 3,497,668 A | 2/1970 | Hirsch |
| 3,517,440 A | 6/1970 | Cotyon et al. |
| 3,517,446 A | 6/1970 | Corlyon et al. |
| 3,531,868 A | 10/1970 | Stevenson |
| 3,623,064 A | 11/1971 | Kagan |
| 3,795,150 A | 3/1974 | Eckhardt |
| 3,875,488 A | 4/1975 | Crocker et al. |
| 3,890,958 A | 6/1975 | Fister et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 3,944,798 A | 3/1976 | Eaton |
| 4,148,014 A | 4/1979 | Burson |
| 4,160,508 A | 7/1979 | Salisbury, Jr. et al. |
| 4,216,467 A | 8/1980 | Colston |
| 4,236,325 A | 12/1980 | Hall et al. |
| 4,391,282 A | 7/1983 | Ando et al. |
| 4,398,889 A | 8/1983 | Lam et al. |
| 4,436,188 A | 3/1984 | Jones |
| 4,448,083 A | 5/1984 | Hayashi |
| 4,477,043 A | 10/1984 | Repperger |
| 4,477,973 A | 10/1984 | Davies |
| 4,513,235 A | 4/1985 | Acklam et al. |
| 4,550,221 A | 10/1985 | Mabusth |
| 4,550,617 A | 11/1985 | Fraignier et al. |
| 4,560,983 A | 12/1985 | Williams |
| 4,571,834 A | 2/1986 | Fraser et al. |
| 4,581,491 A | 4/1986 | Boothroyd |
| 4,593,470 A | 6/1986 | Davies |
| 4,599,070 A | 7/1986 | Hladky et al. |
| 4,601,206 A | 7/1986 | Watson |
| 4,604,016 A | 8/1986 | Joyce |
| 4,632,341 A | 12/1986 | Repperger et al. |
| 4,638,798 A | 1/1987 | Shelden et al. |
| 4,648,782 A | 3/1987 | Kraft |
| 4,653,011 A | 3/1987 | Iwano |
| 4,654,648 A | 3/1987 | Herrington et al. |
| 4,676,002 A | 6/1987 | Slocum |
| 4,677,355 A | 6/1987 | Baumann |
| 4,679,331 A | 7/1987 | Koontz |
| 4,688,983 A | 8/1987 | Lindbom |
| 4,689,449 A | 8/1987 | Rosen |
| 4,703,443 A | 10/1987 | Moriyasu |
| 4,704,909 A | 11/1987 | Grahn et al. |
| 4,706,294 A | 11/1987 | Ouchida |
| 4,708,656 A | 11/1987 | De Vries et al. |
| 4,712,101 A | 12/1987 | Culver |
| 4,713,007 A | 12/1987 | Alban |
| 4,750,487 A | 6/1988 | Zanetti |
| 4,769,763 A | 9/1988 | Trieb et al. |
| 4,775,289 A | 10/1988 | Kazerooni |
| 4,787,051 A | 11/1988 | Olson |
| 4,791,934 A | 12/1988 | Brunnett |
| 4,794,392 A | 12/1988 | Selinko |
| 4,795,296 A | 1/1989 | Jau |
| 4,798,919 A | 1/1989 | Miessler et al. |
| 4,800,721 A | 1/1989 | Cemenska et al. |
| 4,803,413 A | 2/1989 | Kendig et al. |
| 4,811,608 A | 3/1989 | Hilton |
| 4,819,195 A | 4/1989 | Bell et al. |
| 4,823,634 A | 4/1989 | Culver |
| 4,839,838 A | 6/1989 | LaBiche et al. |
| 4,849,692 A | 7/1989 | Blood |
| 4,857,881 A | 8/1989 | Hayes |
| 4,868,549 A | 9/1989 | Affinito et al. |
| 4,874,998 A | 10/1989 | Hollis, Jr. |
| 4,879,556 A | 11/1989 | Duimel |
| 4,888,877 A | 12/1989 | Enderle et al. |
| 4,891,764 A | 1/1990 | McIntosh |
| 4,891,889 A | 1/1990 | Tomelleri |
| 4,896,554 A | 1/1990 | Culver |
| 4,907,970 A | 3/1990 | Meenen, Jr. |
| 4,907,973 A | 3/1990 | Hon |
| 4,930,770 A | 6/1990 | Baker |
| 4,934,694 A | 6/1990 | McIntosh |
| 4,942,545 A | 7/1990 | Sapia |
| 4,945,305 A | 7/1990 | Blood |
| 4,945,501 A | 7/1990 | Bell et al. |
| 4,949,119 A | 8/1990 | Moncrief et al. |
| 4,961,138 A | 10/1990 | Gorniak |
| 4,961,267 A | 10/1990 | Herzog |
| 4,962,448 A | 10/1990 | DeMaio et al. |
| 4,962,591 A | 10/1990 | Zeller et al. |
| 4,982,504 A | 1/1991 | Soderberg et al. |
| 4,983,786 A | 1/1991 | Stevens et al. |
| 4,983,901 A | 1/1991 | Lehmer |
| 4,985,652 A | 1/1991 | Oudet et al. |
| 5,007,085 A | 4/1991 | Greanias et al. |
| 5,007,300 A | 4/1991 | Siva |
| 5,019,761 A | 5/1991 | Kraft |
| 5,022,407 A | 6/1991 | Horch et al. |
| 5,035,242 A | 7/1991 | Franklin et al. |
| 5,038,089 A | 8/1991 | Szakaly |
| 5,040,306 A | 8/1991 | McMurtry et al. |
| 5,044,956 A | 9/1991 | Behensky et al. |
| 5,050,608 A | 9/1991 | Watanabe et al. |
| 5,072,361 A | 12/1991 | Davis et al. |
| 5,076,517 A | 12/1991 | Ferranti et al. |
| 5,078,152 A | 1/1992 | Bond et al. |
| 5,088,046 A | 2/1992 | McMurtry et al. |
| 5,088,055 A | 2/1992 | Oyama |
| 5,095,303 A | 3/1992 | Clark et al. |
| 5,103,404 A | 4/1992 | McIntosh |
| 5,107,080 A | 4/1992 | Rosen |
| 5,107,262 A | 4/1992 | Cadoz et al. |
| 5,116,051 A | 5/1992 | Moncrief et al. |
| 5,116,180 A | 5/1992 | Fung et al. |
| 5,126,948 A | 6/1992 | Mitchell et al. |
| 5,128,671 A | 7/1992 | Thomas, Jr. |
| 5,131,844 A | 7/1992 | Marinaccio et al. |
| 5,132,672 A | 7/1992 | Clark |
| 5,136,194 A | 8/1992 | Oudet et al. |
| 5,139,261 A | 8/1992 | Openiano |
| 5,142,506 A | 8/1992 | Edwards |
| 5,142,931 A | 9/1992 | Menahem |
| 5,143,505 A | 9/1992 | Burdea et al. |
| 5,146,566 A | 9/1992 | Hollis et al. |
| 5,148,377 A | 9/1992 | McDonald |
| 5,168,183 A | 12/1992 | Whitehead |
| 5,178,012 A | 1/1993 | Culp |
| 5,181,181 A | 1/1993 | Glynn |
| 5,182,557 A | 1/1993 | Lang |
| 5,184,306 A | 2/1993 | Erdman et al. |
| 5,184,319 A | 2/1993 | Kramer |
| 5,185,561 A | 2/1993 | Good et al. |
| 5,186,629 A | 2/1993 | Rohen |
| 5,187,874 A | 2/1993 | Takahashi et al. |
| 5,189,355 A | 2/1993 | Larkins et al. |
| 5,189,806 A | 3/1993 | McMurtry et al. |
| 5,193,963 A | 3/1993 | McAffee et al. |
| 5,197,003 A | 3/1993 | Moncrief et al. |
| 5,204,824 A | 4/1993 | Fujimaki |
| 5,209,131 A | 5/1993 | Baxter |
| 5,209,661 A | 5/1993 | Hildreth et al. |
| 5,212,473 A | 5/1993 | Louis |
| 5,220,260 A | 6/1993 | Schuler |
| 5,223,776 A | 6/1993 | Radke et al. |
| 5,228,356 A | 7/1993 | Chuang |
| 5,230,623 A | 7/1993 | Guthrie et al. |
| 5,235,868 A | 8/1993 | Culver |
| 5,240,417 A | 8/1993 | Smithson et al. |
| 5,243,266 A | 9/1993 | Kasagami et al. |
| 5,251,127 A | 10/1993 | Raab |
| 5,251,156 A | 10/1993 | Heier et al. |
| 5,259,120 A | 11/1993 | Chapman et al. |
| 5,259,894 A | 11/1993 | Sampson |
| 5,262,777 A | 11/1993 | Low et al. |
| 5,264,768 A | 11/1993 | Gregory et al. |
| 5,271,290 A | 12/1993 | Fischer |
| 5,275,174 A * | 1/1994 | Cook .......................... 600/587 |
| 5,275,565 A | 1/1994 | Moncrief |
| 5,286,203 A | 2/1994 | Fuller et al. |
| 5,296,846 A | 3/1994 | Ledley |

| | | |
|---|---|---|
| 5,296,871 A | 3/1994 | Paley |
| 5,299,810 A | 4/1994 | Pierce et al. |
| 5,309,140 A | 5/1994 | Everett, Jr. et al. |
| 5,334,027 A | 8/1994 | Wherlock |
| 5,334,893 A | 8/1994 | Oudet et al. |
| 5,351,692 A | 10/1994 | Dow et al. |
| 5,354,162 A | 10/1994 | Burdea et al. |
| 5,379,663 A | 1/1995 | Hara |
| 5,381,080 A | 1/1995 | Schnell et al. |
| 5,384,460 A | 1/1995 | Tseng |
| 5,389,865 A | 2/1995 | Jacobus et al. |
| 5,396,266 A | 3/1995 | Brimhall |
| 5,396,267 A | 3/1995 | Bouton |
| 5,397,323 A | 3/1995 | Taylor et al. |
| 5,402,582 A | 4/1995 | Raab |
| 5,405,152 A | 4/1995 | Katanics et al. |
| 5,412,880 A | 5/1995 | Raab |
| 5,414,337 A | 5/1995 | Schuler |
| 5,417,696 A | 5/1995 | Kashuba et al. |
| 5,428,748 A | 6/1995 | Davidson et al. |
| 5,429,140 A | 7/1995 | Burdea et al. |
| 5,436,542 A | 7/1995 | Petelin et al. |
| 5,436,640 A | 7/1995 | Reeves |
| 5,440,183 A | 8/1995 | Denne |
| 5,445,166 A | 8/1995 | Taylor |
| 5,451,924 A | 9/1995 | Massimino et al. |
| 5,452,615 A | 9/1995 | Hilton |
| 5,459,382 A | 10/1995 | Jacobus et al. |
| 5,466,213 A | 11/1995 | Hogan et al. |
| 5,467,763 A | 11/1995 | McMahon et al. |
| 5,473,235 A | 12/1995 | Lance et al. |
| 5,512,919 A | 4/1996 | Araki |
| 5,513,100 A | 4/1996 | Parker et al. |
| 5,532,585 A | 7/1996 | Oudet et al. |
| 5,542,672 A | 8/1996 | Meredith |
| 5,547,382 A | 8/1996 | Yamasaki et al. |
| 5,559,432 A | 9/1996 | Logue |
| 5,576,704 A | 11/1996 | Baker et al. |
| 5,576,727 A | 11/1996 | Rosenberg et al. |
| 5,587,937 A | 12/1996 | Massie et al. |
| 5,589,828 A | 12/1996 | Armstrong |
| 5,589,854 A | 12/1996 | Tsai |
| 5,591,082 A | 1/1997 | Jensen et al. |
| 5,591,924 A | 1/1997 | Hilton |
| 5,623,582 A | 4/1997 | Rosenberg |
| 5,629,594 A | 5/1997 | Jacobus et al. |
| 5,634,794 A | 6/1997 | Hildreth et al. |
| 5,642,469 A | 6/1997 | Hannaford |
| 5,643,087 A | 7/1997 | Marcus et al. |
| 5,661,446 A | 8/1997 | Anderson et al. |
| 5,666,138 A | 9/1997 | Culver |
| 5,687,080 A | 11/1997 | Hoyt et al. |
| 5,694,013 A | 12/1997 | Stewart et al. |
| 5,701,140 A | 12/1997 | Rosenberg et al. |
| 5,709,219 A | 1/1998 | Chen et al. |
| 5,714,978 A | 2/1998 | Yamanaka et al. |
| 5,721,566 A | 2/1998 | Rosenberg et al. |
| 5,731,804 A | 3/1998 | Rosenberg |
| 5,734,373 A | 3/1998 | Rosenberg et al. |
| 5,739,811 A | 4/1998 | Rosenberg et al. |
| 5,742,278 A | 4/1998 | Chen |
| 5,766,016 A | 6/1998 | Sinclair et al. |
| 5,767,839 A | 6/1998 | Rosenberg |
| 5,781,172 A | 7/1998 | Engel et al. |
| 5,785,630 A | 7/1998 | Bobick et al. |
| 5,790,108 A | 8/1998 | Salcudean et al. |
| 5,793,598 A * | 8/1998 | Watanabe et al. ............ 361/144 |
| 5,805,140 A * | 9/1998 | Rosenberg et al. ........... 345/161 |
| 5,825,308 A | 10/1998 | Rosenberg |
| 5,831,408 A | 11/1998 | Jacobus et al. |
| 5,889,672 A | 3/1999 | Schuler et al. |
| 5,990,869 A | 11/1999 | Kubica et al. |
| 6,001,014 A | 12/1999 | Ogata et al. |
| 6,002,184 A | 12/1999 | Delson et al. |
| 6,004,134 A | 12/1999 | Marcus et al. |
| 6,050,718 A | 4/2000 | Schena et al. |
| 6,088,017 A | 7/2000 | Tremblay et al. |
| 6,100,874 A | 8/2000 | Schena et al. |
| 6,104,158 A | 8/2000 | Jacobus et al. |
| 6,104,382 A | 8/2000 | Martin et al. |
| 6,166,723 A | 12/2000 | Schena et al. |
| 6,184,868 B1 | 2/2001 | Shahoian et al. |
| 6,486,872 B2 | 11/2002 | Rosenberg et al. |
| 6,501,203 B2 * | 12/2002 | Tryggvason ................. 310/90.5 |
| 6,639,581 B1 | 10/2003 | Moore et al. |
| 6,704,001 B1 * | 3/2004 | Schena et al. ................ 345/161 |
| 7,193,607 B2 | 3/2007 | Moore et al. |

FOREIGN PATENT DOCUMENTS

| | | |
|---|---|---|
| EP | 0085518 A1 | 8/1983 |
| EP | 0349086 | 1/1990 |
| EP | 0626634 A2 | 11/1994 |
| EP | 0680132 A1 | 11/1995 |
| EP | 0834338 A2 | 4/1998 |
| GB | 2254911 | 10/1992 |
| GB | 2347199 A | 8/2000 |
| JP | H2-185278 | 7/1990 |
| JP | H4-8381 | 1/1992 |
| JP | 4-34610 * | 5/1992 |
| JP | H5-192449 | 8/1993 |
| JP | H7-24147 | 1/1995 |
| WO | WO 95/20787 | 8/1995 |
| WO | WO 95/20788 | 8/1995 |
| WO | WO 95/32459 | 11/1995 |
| WO | WO 96/16397 | 5/1996 |
| WO | WO 96/22591 | 7/1996 |
| WO | WO 96/39944 | 12/1996 |
| WO | WO 96/42078 | 12/1996 |
| WO | WO 97/12357 | 4/1997 |
| WO | WO 97/19440 A1 * | 5/1997 |
| WO | WO 98/40758 A2 | 10/1998 |
| WO | WO 00/25294 | 5/2000 |
| WO | WO 01/11775 A1 | 2/2001 |

OTHER PUBLICATIONS

Russo, "The Design and Implementation of a Three Degree-of-Freedom Force Output Joystick", Submitted to the Department of Mechanical Engineering on May 11, 1990.*

Snow et al., "Model-X Force-Reflecting-Hand-Controller," NT Control No. MPO-17851; JPL Case No. 5348, pp. 1-4, (Jun. 15, 1989).*

Adelstein et al., "A High Performance Two Degree-of-Freedom Kinesthetic Interface", NASA Conference Publication 10071, N95-14042, pp. 108-113, (Mar. 4-9, 1990).* p. J Berkelman, R.L. Hollis, and S.E. Salcudean, Interacting with Virtual Environments using a Magnetic Levitation Haptic Interface, Aug. 1995, International Conference on Intelligent Robots and Systems [IROS ] '95, Pittsburgh.*

Automation and Robotics publication by esa (European Space Agency), on Sep. 15, 2000, pp. 21-23.*

Internet Archive Wayback Machine printout for Automation and Robotics publication, Jun. 18, 2008, p. 1 of 1.*

Rosenberg, Louis B. et al., "Perceptual Decomposition of Virtual Haptic Surfaces," IEEE, Oct. 1993.

Adelstein et al., Human Machine Interfaces for Teleoperators and Virtual Environments, *NASA Conference Publication* 10071, N95-14042, pp. 108-113, (Mar. 4-9, 1990).

Snow et al., "Model-X Force Reflecting-Hand-Controller," NT Control No. NPO-17851; JPL Case No. 7348, pp. 151, (Jun. 15, 1989).

Russo, "The Design and Implementation of a Three Degree of Freedom Force Output Joystick," Submitted to the Department of Mechanical Engineering on May 11, 1990.

Adelstein et al., "Design and Implementation of a Force Reflecting Manipulandum for Manual Control Research, " Dept. of Mech. Eng., Cambridge, MA, 1992, pp. 1-12.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Patrick et al., "Design and Testing of a Non-reactive, Fingertip, Tactile Display for interaction with Remote Environments," *Cooperative Intelligent Robotics in Space*, Rut J. deFigdeiredo et al., Editor, Proc SPIE vol. 1387, pp. 215-222, 1990.

Adelstein, "A Virtual Environment System for the Study of Human Arm Tremor," Ph. D. Dissertation, Dept. of Mechanical Engineering, MIT, Jun. 1989.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings of Fourth CISM-IFToMM, Sep. 8-12, 1981.

Mcaffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph. D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21-23, 1991.

Shimoga, "Finger Force and Touch Feedback Issues in Dexterous Telemanipulation," Proceedings Fourth Annual Conference on Intelligent Robotic Systems for Space Exploration, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback in a Computer Mouse," Proceedings of Fourteenth Annual Northeast Bioengineering Conference, University of New Hampshire, Mar. 10-11, 1988.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and deaf-blind individuals," IEEE Virtual Reality Annual International Symposium, Seattle, WA, Sep. 18-22, 1993.

Rabinowitz et al., "Multidimensional tactile displays: Identification of vibratory intensity, frequency, and contactor area," Journal of the Accoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy et al., "A Laboratory Breadboard System for Dual-Arm Teleoperation," SOAR '89 Workshop, JSC, Houston, TX, Jul. 25-27, 1989.

Ouh Young et al., "A Low-Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine the Cutting Edge, Sep. 8-11, 1994.

Bejczy et al., "Universal Computer Control System (UCCS) for Space Telerobots," CH2413-3/87/0000/0318501.00 1987 IEEE, 1987.

"High Performance Model of the Immersion Probe," Immersion Probe—MD.TM., Immersion Human Interface Corporation, 1993.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of a Force-Feedback Touch-Introducing Actuator for Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Buss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," Presence, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by the Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," $2^{nd}$ Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of a Low-Cost Force Feedback Joystick and its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cybernnan from Logitech," at http://www.ibiblio.org/GameBytes/Issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instruction With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

"12-V Voice Coil Motor Driver," Si9961 Jun. 6, 1994, pp. 4-10-4-16.

"Foot-Operated Mouse," IBM Technical Disclosure Bulletin, Apr. 1986, vol. 28, No. 11.

"Proceedings of the IFIP Congress 65," International Federation for Information Processing, Information Processing 1965, vol. 3, New York, May 24-29, 1965, pp. 506.

"The Personal Digltizer.TM.," Immersion Human Interface Corporation 1994.

"Useful Technology for Your Idea File," Design News, Mar. 7, 1994, pp. 63.

3D Human Interface Tool, Immersion Probe.TM., Immersion Human Interface Corporation 1994.

Atkinston, William D. et al, "Computing with Feeling," Comput. & Graphics, vol. 2, No. 2-E, pp. 97-103.

Bejczy, Antal K., "The Phantom Robot: Predictive Displays for Teleoperation with lime Delay," IEEE 1990, pp. 546-550.

Bostrom, et al., "Design of an Interactive Lumbar Puncture Simulator With Tactile Feedback," 1993 IEEE, 0-7803-1363, pp. 280-286.

Burdea, Grigore et al., "A Portable Dextrous Master with Force Feedback," Presence: Teleoperators and Virtual Enviroments, MIT Press, Jun. 1991.

Buttolo et al., "Hard Disk Actuators for Mini Teleoperation", Proceedings SPIE Telemanipulator and Telepresence Technologies, Oct. 31, 1994, pp. 1-8.

Colgate J. Edward et al., Implementation of Stiff Virtual Walls in Force-Reflecting Interfaces, Sep. 22, 1993, pp. 1-9.

Fischer, Patrick et al., "Specification and Design of Input Devices for Teleoperation," 1990.

Fisher, S.S. et al., "Virtual Environment Display System," ACM Interactive 3D Graphics, Oct. 1986.

Herndon, J.N. et al., "The State-of-the-Art Model M-2 Maintenance System," Proceedings of the 1984 National Topical Meeting on Robotics and Remote Handling in Hostile Environments, American Nuclear Society, pp. 59-65.

Kelley, et al., "On the Development of a Force-Feedback Mouse and Its Integration into a Graphical User Interface," Symp. on Haptic Interfaces for Virtual Environment and Teleoperator Systems, Int'l Mech. Eng. Congress and Exhibition, Nov. 1994.

Kilpatrick, Paul Jerome, "The Use of a Kinesthetic Supplement in an Interactive Graphics System", Univ. North Carolina at Chapel Hill, 1976.

Kim, Won S. et al., "Graphics Displays for Operator Aid in Telemanipulation," IEEE 1991, pp. 1059-1067.

Kim, Won S. et al., A Teleoperation Training Simulator with Visual and Kinesthetic Force Virtual Reality.

Krueger, Myron W., Artificial Reality 1988, pp. 54-75.

Meyer, Kenneth et al., "A Survey of Position Trackers," The Massachusetts Institute of Technology 1992, Presence, vol. 1, No. 2.

Noll, A. Michael, "Man-Machine Tactile Communication Dissertation,"Polytechnic Institute of Brooklyn, Jun. 1971, pp. 1-8.

Ouh-young, Ming et al., "Force Display Performs Better than Visual Display in a Simple 6-D Docking Task," IEEE 1989, pp. 1462-1466.

Ouh-Young, Ming et al., "Using a Manipulator for Force Display in Molecular Docking," IEEE 1988, pp. 1824-1829.

Rosenberg, Louis B., "The Use of Virtual Fixtures as Perceptual Overlays to Enhance Operator Performance in Remote Environments," Air Force Material Command, Sep. 1992, pp. 1-42.

Rosenberg, Louis B., "Virtual Haptic Overlays Enhance Performance in Telepresence Tasks," SPIE 1994.

Rosenberg, Louis 8., The Use of Virtual Fixtures to Enhance Operator Performance in Time Delayed Teleoperation, Mar. 1993, pp. 1-45.

Smith, Geoffrey, "Call It Palpable Progress," Business Week, Oct. 9, 1995, pp. 93, 96.

Tan, H. et al., "Manual Resolution of Compliance When Work and Force Cues are Minimized," ASME 1993, DSC—vol. 49, pp. 99-104.

Tan, Hong Z. et al., "Human Factors for the Design of Force-Reflecting Haptic Interfaces," Tan, Srinlvasan, Eberman, & Chang, ASME WAM 1994, pp. 1-11.

Tavkhelidze, D.S. "Kinematic Analysis of Five-Link Spherical Mechanisms," Mechanism and Machine Theory 1974, vol. 9, pp. 181-190.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708-712.

Winey III, Calvin McCoy, "Computer Simulated Visual and Tacticle Feedback as an Aid to Manipulator and Vehicle Control," MIT, Jun. 1981.

Yamakita, M. et al., Tele-Virtual Reality of Dynamic Mechanical Model, IEEE Jul. 7-10, 1992, pp. 1103-1110.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Patrick et al., "Design and Testing of a Non-reactive, Fingertip, Tactile Display for Interaction with Remote Environments," Cooperative Intelligent Robotics in Space, Rui J. deFigueiredo et al, Editor, Proc. SPIE vol. 1387, pp. 215-222, 1990.

Adelstein, "A Virtual Environment System for the Study of Human Arm Tremor," Ph.D. Dissertation, Dept. of Mechanical Engineering, MIT, Jun. 1989, archived Mar. 13, 1990.

Bejczy, "Sensors, Controls, and Man-Machine Interface for Advanced Teleoperation," Science, vol. 208, No. 4450, pp. 1327-1335, 1980.

Bejczy et a.l, "Generalization of Bilateral Force-Reflecting Control of Manipulators," Proceedings of Fourth CISM-IFToMM, Sep. 8-12, 1981.

McAffee et al., "Teleoperator Subsystem/Telerobot Demonstrator: Force Reflecting Hand Controller Equipment Manual," JPL 1988, JPL D-5172.

Minsky, "Computational Haptics: The Sandpaper System for Synthesizing Texture for a Force-Feedback Display," Ph.D. Dissertation, MIT, Jun. 1995, archived Jul. 6, 1995.

Jacobsen et al., "High Performance, Dextrous Telerobotic Manipulator With Force Reflection," Intervention/ROV '91 Conference & Exposition, Hollywood, Florida, May 21-23, 1991.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback in a Computer Mouse," Proceedings of Fourteenth Annual Northeast Bioengineering Conference, University of New Hampshire, Mar. 10-11, 1988.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and deaf-blind individuals," IEEE Virtual Reality Annual International Symposium, Seattle, WA, Sep. 18-22, 1993.

Rabinowitz et al., "Multidimensional tactile displays: Identification of vibratory intensity, frequency, and contractor area," Journal of the Acoustical Society of America, vol. 82, No. 4, Oct. 1987.

Bejczy et al., "Kinesthetic Coupling Between Operator and Remote Manipulator," International Computer Technology Conference, The American Society Mechanical Engineers, San Francisco, CA, Aug. 12-15, 1980.

Bejczy et al., "A Laboratory Breadboard System for Dual-Arm Teleoperation," SOAR '89 Workshop, JSC, Houston, TX, Jul. 25-27, 1989.

Ouhyoung et al., "A Low-Cost Force Feedback Joystick and its Use in PC Video Games," IEEE Transactions on Consumer Electronics, vol. 41, No. 3, Aug. 1995.

Marcus, "Touch Feedback in Surgery," Proceedings of Virtual Reality and Medicine the Cutting Edge, Sep. 8-11, 1994.

Bejczy, et al., "Universal Computer Control System (UCCS) for Space Telerobots," CH2413-3-87/0000/0318501.00 1987 IEEE, 1987.

Zan at al, "Manual resolution of Compliance When Work and Force Cues are Minimized," DSC-vol. 49, Advances in Robotics, Mechatronics and Haptic Interfaces ASME 1993, The American Society og Mechanical Engineers, pp. 99-104, (Nov. 28-Dec. 3, 1993).

Addsteln et al., "Design and Implementation of a Force Reflecting Manipulandum for Manual Control research," DSC-vol. 42, Advances in Robotics, pp. 1-12, (1992).

Balgrie, "Electric Control Loading—A Low Cost, High Performance Alternative," Proceedings, pp. 247-254, (Nov. 6-8, 1990).

Iwata, "Pen-based Haptic Virtual Environment" 0-7803-1363-1/93 IEEE, pp. 287-292, (1993).

Iwata et al., "Volume Haptization," 0-8186-4910-0/93 IEEE, pp. 16-23, (1993).

Iwata, "Artificial Reality with Force-feedback: Development of Desktop Virtual Space with Compact Master Manipulator," Computer Graphics, vol. 24, No. 4—ACM-0-89791-344-2/901008/0165, pp. 165-170, (Aug. 1990).

Russo, "The Design and Implementation of a Three Degree of Freedom Force Output Joystick," MIT Libraries Archives Aug. 14, 1990, pp. 1-131, (May 1990).

Burdea et al., "Dextrous telerobotics with fame feedback—an overview. Part 2: Human factors," Robotics (1991) vol. 9,p p. 291-298, (Jun. 22, 1990).

Brooks et al., "Hand Controllers for Teleoperation—A State-of-the-Art Technology Survey and Evaluation," JPL Publication 85-11; NASA-CR-175890; N85-28559, pp. 1-84, (Mar. 1, 1985).

Jones et al., "A perceptual analysis of stiffness," ISSN 0014.4819 Springer International (Springer-Verlag); Experimental Brain Research, vol. 79. No. 1, pp. 150-156, (1990).

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, (May 2, 1993).

Snow et al., "Compact Force-Reflecting Hand Controller," NASA TechBriefs, Apr. 1991, vol. 5, No. 4, p. 88, (Apr. 1991).

Bejczy et al., "Controlling Remote Manipulators Through Kinesthetic Coupling," Computers in Mechanical Engineering NT Control No. MPO-17851; JPL Case No. 5348 Attachment, pp. 48-61, (Jul. 1983).

Kotoku, "A Predictive Display with Force Feedback and its Application to Remote Manipulation System with Transmission Time Delay," 0-7803-0737-2/92 1992 © IEEE, pp. 239-246, (Jul. 7-10, 1992).

Kotoku et al., "Environment Modeling for the Interactive Display (EMID) used in Telerobotic Systems," IEEE Cat. No. 91TH037S-6, pp. 999-1004, (Nov. 3-5, 1991).

Hirota et al., "Development of Surface Display," 0-7803-1363-1/93 © 1993 IEEE, pp. 256-262, (1993).

Ouh-Young, "Force Display in Molecular Docking," Order No. 9034744, p. 1-369, (1990).

Tadros, Control System Design for a Three Degree of Freedom Virtual Environment Simulator Using Motor/Brake Pair Actuators, *MIT Archive © Massachusetts Institute of Technology*, pp. 1-88, (Feb. 1990).

Caldwell et al., "Enhanced Tactile Feedback (Tele-Taction) Using a Multi-Functional Sensory System," 1050-4729/93, pp. 955-960, (1993).

Adelstein, Design and Implementation of a Force Reflecting Manipulandum for Manual Control research, *DSC-vol. 42, Advances in Robotics*, Edited by H. Kazerooni, pp. 1-12, (1992).

Gotow et al., "Controlled Impedance Test Apparatus for Studying Human Interpretation of Kinesthetic Feedback," *WA11:00*, pp. 332-337.

Stanley et al.; "Computer Simulation of Interacting Dynamic Mechanical Systems Using Distributed Memory Parallel Processors," *DSC-vol. 42, Advances in Robotics*, pp. 55-61, (1992).

Russo, "Controlling Dissipative Magnetic Particle Brakes in Force Reflective Devices," *DSC vol. 2, Advances in Robotics*, pp. 63-70, (1992).

Fukumoto et al., "Active Click: Tactile Feedback for Touch Panels," *NTT DoCoMo CHI 2001*, pp. 1-3, (Apr. 2001).

Wright, "A Manufacturing Hand," *ISSN 0736-5845/85* (704), pp. 13-23, (1985).

Batter, et al., "Grope-1: A Computer Display to the Sense of Feel", *University of North Carolina at Chapel Hill*, Chapel Hill, North Carolina, USA.

Minsky, et al., "Felling and Seeing: Issues in Force Display", *Department of Computer Science, University of North Carolina at Chapel Hill*, Chapel Hill, NC 27599,1990 ACM.

Rosenberg, Louis B., "Perceptual Design of a Virtual Rigid Surface Contact," *Center for Design Reseach Stanford University*, Air Force Material Command, Apr. 1993, 1-41.

Gotow, J.K, et al., "Perception of Mechanical Properties at the Man-Machine Interface," *IEEE 1987*, pp. 688-689.

Adelstein Bernard D. et al., "A High Performance Two Degree-of-Freedom Kinesthetic Interface," *Massachusetts Institute of Technology 1992*, pp. 108-112.

Hannaford, B. et al., "Performance Evaluation of a Six-Axis Generalized Force-Reflecting Teleoperator," *IEEE Thansactions on Systems, Man, and Cybernetics*, 1991.

Akamatsu, M., et al., "Multimodal Mouse: A Mouse-Type Device with Tactile and Force Display", *Presence*, vol. 3, No. 1, Winter 1994, 73-80.

Buttolo et.al., "Pen Based Force Display for Precision Manipulation in Virtual Environments", *IEEE* Mar. 1995, pp. 217-224.

Howe, R et al., "Task Performance with a Dextrous Teleopetated Hand System," *Proceedings of SPIE*, vol. 1833, Nov. 1992.

Payette, J. et al., "Evaluation of a Force Feedback (Haptic) Computer Pointing Device in Zero Gravity", *Proceedings of the ASME Dynamics System, and Control Division*, ASME Oct. 17, 1996, pp. 547-553.

Kelley, A.J. et al., "MagicMouse: Tactile and Kinesthetic Feedback in the Human-Computer Interface using an Electromagnetically Actuated Input/Output Device," *Dept. of Elec. Engineering*, Univ. of British Columbia, 1993, pp. 1-27.

Iwata, H., "Artificial Reality with Force-feedback: Development of Desktop Virtual Space with Compact Master Manipulator," *Computer Graphics*, vol. 24, No. 4, 1990, pp. 165-170.

Schmidt, Brian et al., "Application Areas for a Force-Feedback Joystick," *ASME 1993*, DSC-vol. 49, pp. 47-54.

Ellis, R.E. et al., "Design and Evaluation of a High-Performance Prototype Planar Haptic Interface," *ASME* Dec. 3, 1993, DSC-vol. 49, pp. 55-64.

Millman, P. et al., "Design of a Four Degree-of-Freedom Force-Reflecting Manipulandum with a Specified Force/Torque Workspace," *IEEE CH2969-4*, 1991, pp. 1488-1492.

Hlrota, Koichi et al., "Development of Surface Display," *IEEE 0-7803-1363-1*, 1993, pp. 256-262.

Brooks, F. et al., "Project GROPE— Haptic Displays for Scientific Visualization," *Computer Graphics*, vol. 24, No. 4, 1990, pp. 177-185.

Ramsteln et al., "The Pantograph: A Large Workspace Haptic Device for a Multimodal Human Computer Interaction," *Computer-Human Interaction*, CHI '94, 1994, pp. 1-3.

Ramstein, C et al., "Combining Haptic and Braille Technologies: Design Issues and Pilot Study," *ASSETS '96*, ACM 0-89791-776-6,1996, pp. 37-44.

Slocum, A., *Precision Machine Design*, Prentice Hall, Englewood Cliffs, New Jersey, pp. 661-662.

Rosenberg, L., "Virtual Fixtures as Tools to Enhance Operator Performance in Telepresence Environments," *SPIE Telemanipulator Technology*, 1993.

Hannaford, B. et al., "Scaling of Direct Drive Robot Arms," *Int'l Journal of Robotics Research*, 1996 pp. 1-47.

Hayward, V. et al., "Design and Multi-Objective Optimization of a Linkage for a Haptic Interface," *Advances in Robot Kinematics and Computationed Geometry*, 1994, pp. 359-368.

* cited by examiner

FORCE FEEDBACK DEVICE INCLUDING ACTUATOR WITH MOVING MAGNET

CROSS REFERENCE TO RELATED APPLICATIONS

This application is a Continuation of U.S. patent application Ser. No. 09/431,383, filed Nov. 1, 1999, now U.S. Pat. No. 6,704,001, which claims the benefit of U.S. provisional application no. 60/107,267, filed Nov. 4, 1998, by Schena et al., entitled "Force Feedback: Device Including Actuator with Moving Magnet," and is a continuation-in-part of application Ser. No. 09/140,717, filed on Aug. 26, 1998, now Pat. No. 6,201,533, which is a division of application Ser. No. 08/560,091, filed Nov. 17, 1995, now Pat. No. 5,805,140, each of which are incorporated by reference in their entireties.

BACKGROUND OF THE INVENTION

The present invention relates generally to interface devices between humans and computers, and more particularly to computer interface devices that provide force feedback to the user using actuators.

Computer systems are used extensively in many different industries to implement computer controlled simulations, games, and other application programs. More particularly, these types of games and simulations are very popular with the mass market of home consumers. A computer system typically displays a visual environment to a user on a display screen or other visual output device. Users can interact with the displayed environment to play a game, experience a simulation or "virtual reality" environment, or otherwise influence events or images depicted on the screen or in an application program or operating system. Such user interaction can be implemented through a human-computer interface device, such as a joystick, "joypad" button controller, mouse, trackball, stylus and tablet, foot or hand pedals, or the like, that is connected to the computer system controlling the displayed environment. The computer updates the game or simulation in response to the user's manipulation of a moved object such as a joystick handle or mouse, and provides feedback to the user utilizing the display screen and, typically, audio speakers.

Force feedback interface systems, also known as haptic systems, additionally provide force feedback to a user of the computer system. In a typical configuration, a host computer implements software such as an application program, virtual reality simulation, or game and communicates with a connected force feedback interface device. The user grasps a user object of the interface device, such as a joystick, mouse, steering wheel, stylus, etc., and moves the object in provided degrees of freedom. The movement of the user manipulatable object is sensed by the host computer using sensors, and force sensations controlled by the host computer are provided to the user object using actuators of the force feedback interface device. Force feedback can be effectively used to simulate a variety of experiences, including an impact of a surface, a pull of gravity, a crash in a vehicle, a firing of a gun, a bumpy road, etc., and can thus supply the mass market of computer users an entirely new dimension in human-computer interaction.

One problem with existing force feedback systems is that the actuators used in the interface device are expensive and/or inefficient. One common type of actuator used is a DC motor, which is quite bulky and expensive. The cost of the actuators tends to be a significant part of the overall cost of a device, and in the low-cost, competitive consumer market, any unnecessary costs translate into higher costs for the consumer. Other types of actuators used include voice coil actuators, in which a coil is moved through a magnetic field. However, in a voice coil actuator, circuit or wires which supply current to the coil flex with the motion of the coil. Such a flex circuit can be expensive since it must maintain reliability over the life over the actuator. In addition, a coil having current flowing through it tends to build up heat, and this heat may require a large heatsink coupled to the coil to be dissipated properly. If such a heatsink is provided with the moving coil, less efficient heatsinks are used to reduce weight and/or bulk of the moving part. Therefore, more efficient, low cost actuators that provide high fidelity force sensations are desirable for use in mass market force feedback devices.

SUMMARY OF THE INVENTION

The present invention provides a human/computer interface device and method which can provide low cost and highly realistic force feedback to the user of the device using moving magnet actuators.

A force feedback interface device and method of the present invention is coupled to a host computer that displays a graphical environment, the device including a user object physically contacted by a user and moveable in a degree of freedom. A sensor detects a position of the user manipulatable object in the degree of freedom and provides a sensor signal to the host computer, where the sensor signal includes information representative of the position of the user object. An actuator is coupled to the device or user object and outputs a force on the user manipulatable object or a housing of the device. The actuator includes a magnet and a grounded coil, where the magnet moves approximately within a plane with respect to the coil, and wherein a current is provided in the coil to generate the force. Other embodiments provide a magnet that moves in a linear degree of freedom within a coil housing, or provide an at least partially spherical magnet providing rotary degrees of freedom to a user manipulatable object coupled to the magnet.

Preferably, a microprocessor local to the interface device and separate from the host computer is included in the interface device. The local microprocessor provides a signal to the actuator to output the force, and also receives and parses host commands from the host computer, where the host commands cause the force to be output. A support mechanism is preferably coupled between the user manipulatable object and the actuator, and can provide one or more rotary or linear degrees of freedom. The support mechanism can be a five-bar linkage, a frame that moves linearly, a joint member, or other mechanism. The sensor can be a photodiode sensor, and the user manipulatable object can be a joystick handle, a mouse, steering wheel, or other object.

The embodiment including a frame support mechanism includes multiple bearings positioned between the frame and a ground surface, and each of the bearings preferably provide motion in both of the degrees of freedom. In one embodiment, each of the bearings includes a ball that is positioned between an indentation in the frame and an indentation in the ground surface and which rolls to provide motion of the frame. The magnet of each actuator is coupled to the frame and the coil is wrapped around a projection coupled to a grounded surface. Four actuators can be provided, each of the actuators positioned approximately in a mid portion of each side of the rectangularly-shaped frame. An anti-rotation mechanism can be coupled to the frame to reduce a tendency of the frame to rotate during its motion.

The interface apparatus of the present invention includes several low cost components that are suitable for providing accurate force feedback for the home market and other high volume markets. In contrast with previous use of motors and voice coil actuators, the use of moving magnet actuators in a force feedback interface device allows the interface device to be manufactured inexpensively yet include capability to output high quality, realistic forces.

These and other advantages of the present invention will become apparent to those skilled in the art upon a reading of the following specification of the invention and a study of the several figures of the drawing.

BRIEF DESCRIPTION OF THE DRAWINGS

FIG. 3b is a sectional side elevational view of the moving magnet actuator of FIG. 3a;

FIG. 3c is a perspective view of an alternate embodiment of the force feedback interface device of FIG. 3a;

FIGS. 4b and 4c are side elevational and top plan views, respectively, of the force feedback interface device of FIG. 4a.

DETAILED DESCRIPTION OF PREFERRED EMBODIMENTS

Figure 1:
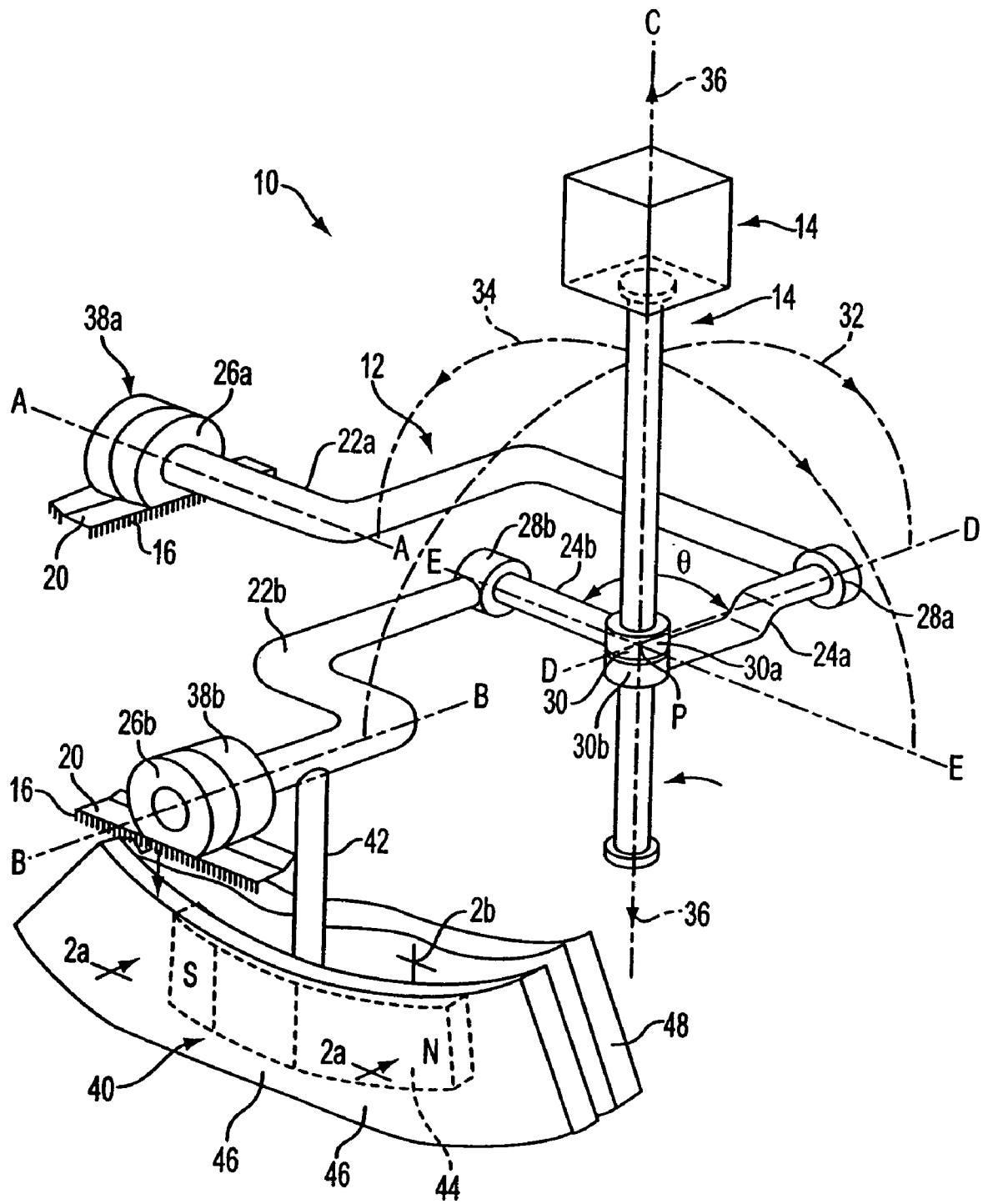
FIG. 1 is a perspective view of a first embodiment of a force feedback interface mechanism of the present invention including a moving magnet actuator.

FIG. 1 is a perspective view of one embodiment of a mechanical system 10 of the present invention for use in a force feedback interface system and including an actuator having a moving magnet. System 10 provides mechanical input and output in accordance with the present invention and includes a gimbal mechanism 12 and a user manipulatable object (or "manipulandum") 14.

System 10 is preferably included within a force feedback interface device that is coupled to a host computer system. The mechanical system 10 mechanically provides the degrees of freedom available to the user object 14 and allows sensors to sense movement in those degrees of freedom and actuators to provide forces in those degrees of freedom. This is described in greater detail below.

The force feedback interface device is adapted to provide data from which a computer or other computing device such as a microprocessor (see FIG. 5) can ascertain the position and/or orientation of the user object as it moves in space. This information is then translated to an image on a computer display device. For example, the interface device may be used by a user to change the position of a user controlled graphical object or view on the display screen by changing the position and/or orientation of the user object 14, the computer being programmed to change the position of the graphical object or view in proportion to the change in position and/or orientation of the user object. In other words, the user object is moved through space by the user which indicates to the computer how to update the implemented program.

Gimbal mechanism 12, in the described embodiment, provides the degrees of freedom for user manipulatable object 14 and provides support for the user object on a grounded surface 16 (schematically shown as part of ground member 20). Gimbal mechanism 12 can be a five-member linkage that includes a ground member 20, extension members 22a and 22b, and central members 24a and 24b. Ground member 20 is coupled to a ground surface which provides a reference and stability for system 10. Ground member 20 is shown in FIG. 1 as two separate members coupled together through grounded surface 16, but is preferably a single surface or structure. The members of gimbal mechanism 12 are rotatably coupled to one another through the use of rotatable bearings or pivots, wherein extension member 22a is rotatably coupled to ground member 20 by bearing 26a and can rotate about an axis A, central member 24a is rotatably coupled to extension member 22a by bearing 28a and can rotate about a floating axis D, extension member 22b is rotatably coupled to ground member 20 by bearing 26b and can rotate about axis B, central member 24b is rotatably coupled to extension member 22b by bearing 28b and can rotate about floating axis E, and central member 24a is rotatably coupled to central member 24b by bearing 30 at a center point P at the intersection of axes D and E. Preferably, central member 24a is coupled to one rotatable portion 30a of bearing 30, and central member 24b is coupled to the other rotatable portion 30b of bearing 30. The axes D and E are "floating" in the sense that they are not fixed in one position as are axes A and B. Axes A and B are substantially mutually perpendicular, e.g. at least within five degrees or ten degrees of perpendicular, or more preferably within less than one degree of perpendicular.

Gimbal mechanism 12 is formed as a five member closed chain. Each end of one member is coupled to the end of another member. The five-member linkage is arranged such that extension member 22a, central member 24a, and central member 24b can be rotated about axis A in a first degree of freedom. The linkage is also arranged such that extension member 22b, central member 24b, and central member 24a can be rotated about axis B in a second degree of freedom. When user object 14 is positioned at the "origin" as shown in FIG. 1, an angle θ between the central members 24a and 24b is about 90 degrees. When object 14 is rotated about one or both axes A and B, central members move in two fashions: rotation about axis D or E by bearing 28b and/or 28a, and rotation about axis C by bearing 30 such that angle θ changes. For example, if the object 14 is moved into the page of FIG. 1 away from the viewer, or out of the plane of the page toward the viewer, then the angle θ will decrease. If the object is moved to the left or right as shown in FIG. 1, the angle θ will increase.

User manipulatable object 14 is coupled to gimbal mechanism 12 and is preferably an interface object for a user to grasp or otherwise manipulate in three dimensional (3D) space. User object 14 can be any of a wide variety of objects or articles, as described with respect to FIG. 5. For example, object 14 can be a joystick as shown in FIG. 1 that is grasped by a hand of the user and which is coupled to central member 24a and central member 24b at the point of intersection P of axes A and B such that it extends out of the plane defined by axis A and axis B. User manipulatable object 14 can be rotated about axis A by rotating extension member 22a, central member 24a, and central member 24b in a first revolute degree of freedom, shown as arrow line 32. User object 14 can also be rotated about axis B by rotating extension member 22b and the two central members about axis B in a second revolute degree of freedom, shown by arrow line 34. As user object 14 is moved about axis A, floating axis D varies its position, and as user object 14 is moved about axis B, floating axis E varies its position. The floating axes E and D are coincident with the fixed axes A and B, respectively, when the user object is in a center position as shown in FIG. 1.

In some embodiments, the user manipulatable object 14 is translatably coupled to members 24a and 24b and thus can be linearly translated, independently with respect to the gimbal mechanism 12, along floating axis C, providing a third degree of freedom as shown by arrows 36. Furthermore, the user object 14 is in some embodiments rotatably coupled to members 24a and 24b and can be rotated about floating axis C.

Sensors 38a and 38b can be provided to detect the position of the user object 14 in provided degrees of freedom about axes A and B, respectively. A variety of different types of sensors can be used. For example, as shown in FIG. 1, optical encoders 38a and 38b can have rotatable shafts coupled to the extension members 22a and 22b, respectively, to measure the rotation of the extension members about their respective axes, while the housings of the sensors are grounded. Optical encoders typically have a disc or arc having regularly-spaced markings pass through an emitter-detector pair to determine the position of the disc based on the number of markings sensed, as is well known to those skilled in the art. Other types of sensors, such as analog potentiometers, can also be used. Alternatively, non-contact sensors such as optical sensors (emitters and detectors or lateral effect photo diode sensors)- or magnetic (Hall effect) sensors can be utilized. The present invention can utilize both absolute and relative sensors. In yet other embodiments, the actuator 40 can be used as both a sensor and an actuator, thus obviating the use of sensors 38.

Also preferably coupled to gimbal mechanism 12 is actuator 40. Actuator 40 is a moving magnet actuator that provides force to a member coupled to the actuator. In the described embodiment, actuator 40 is coupled to extension member 22b and provides a rotary force to the extension member about axis B. In preferred embodiments, another actuator 40 is coupled to extension member 22a in a similar manner.

Actuator 40 includes a pendulum shaft 42, a magnetic pendulum head 44, a coil assembly 46, and a magnetic flux guide 48. Pendulum shaft 42 is rigidly coupled to extension member 22b such that when extension member 22b rotates about axis B, pendulum shaft 42 also rotates about axis B. Magnetic pendulum head 44 is coupled to shaft 42 and rotates with the shaft. Magnetic head 44 is positioned to rotate approximately in a plane between coil assembly 46 and magnetic flux guide 48. In some embodiments, the rotation of magnetic head 44 and shaft 42 can be limited by dimensions of the magnetic flux guide 48 or physical stops. Actuator 40 is described in greater detail with respect to FIGS. 2a and 2b, below.

In other embodiments, an amplification transmission can be included to amplify output forces from actuator 40 onto user object 14 (i.e., provide mechanical advantage) and/or to increase the sensor 38 resolution when detecting a position of the user object 14. For example, a capstan drive mechanism can be provided between actuator and user object 14, as described in greater detail in U.S. Pat. No. 5,767,839, incorporated herein by reference. Belt drive transmissions or gears can also be used in other embodiments.

Figure 2A:
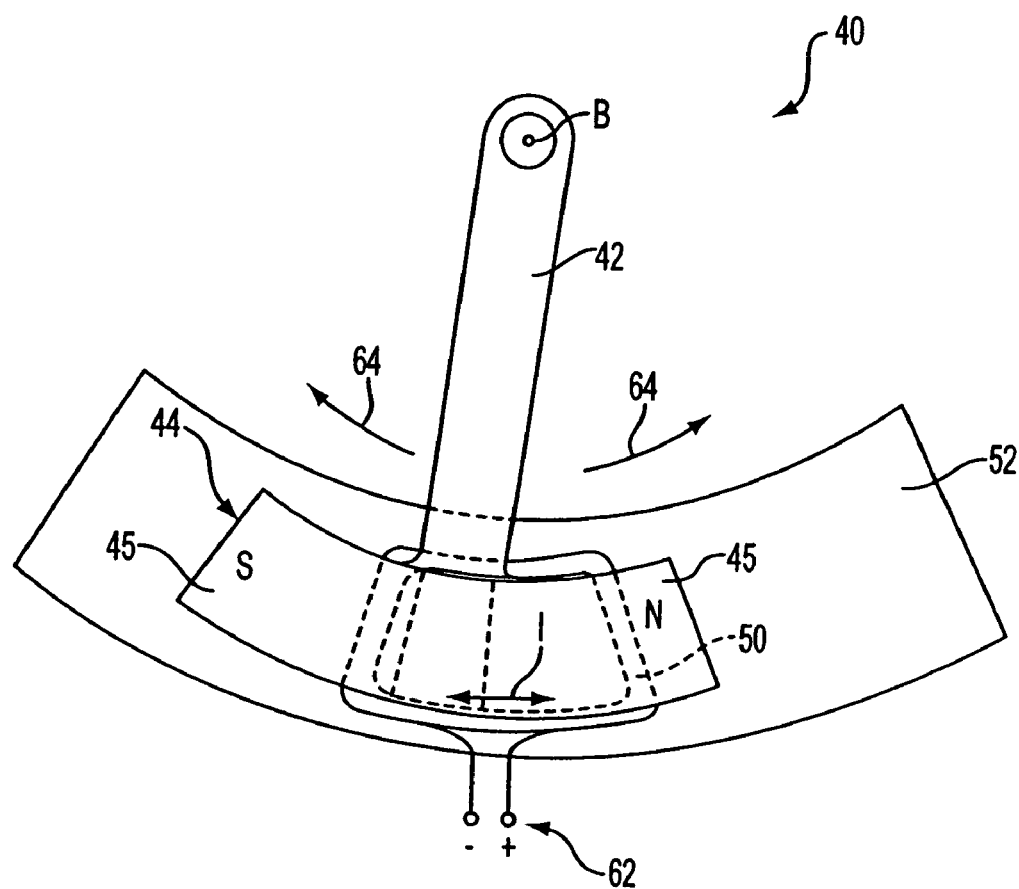
FIGS. 2a and 2b are side elevational and top plan views, respectively, of the moving magnet actuator of the mechanism of FIG. 1.
Figure 2B:
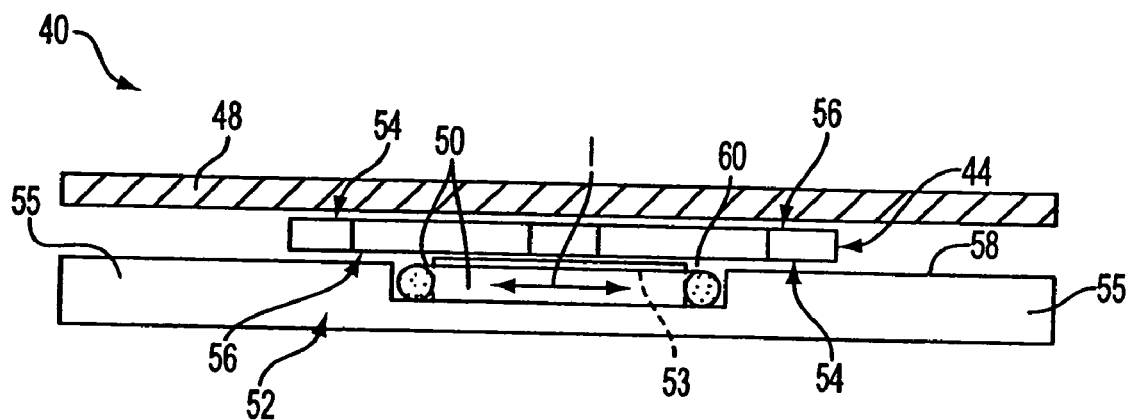

FIGS. 2a and 2b show actuator 40 in greater detail. As shown in the side sectional view of FIG. 2a and the top sectional view of FIG. 2b, magnetic head 44 is positioned to the side of a coil of wire 50 coupled to a support 52 of the coil assembly 46. Coil 50 is a wire or other conductive filament that is positioned in a number of loops surrounding some portion of support 52. In the described embodiment, a portion 53 of the support 52 extends toward pendulum 44 in the middle of coil 52, around which the coil 52 is wrapped. Portions 55 surrounding the coil 50 are preferably at or near the same height as portion 53. Preferably, the coil is wrapped about approximately about an axis that extends approximately parallel to the axis B of rotation of the magnet head 44.

The magnetic head 44 sweeps an arc within a plane such that the head 44 moves parallel to the approximate plane of the coil 50. Magnet head 44 includes two magnets 45, where one magnet 45 has an opposite polarity facing the same direction as the polarity of the other magnet 45. Magnet head 44 includes a north polarity surface 54 and a south polarity surface 56 for each of its magnets, thus providing four magnetic polarities to the region 58 between the magnetic flux guide 48 and support 52 (opposite polarities are provided on opposing surfaces of each of the magnets 45 of head 44). In alternate embodiments, four different magnets can be provided on head 44, two north polarity magnets, and two south polarity magnets. Preferably, a small amount of space 60 is provided between the magnet surface and the coil 50. Flux guide 48 is a housing that allows magnetic flux to travel from one end of the magnet head 44 to the other end, as is well known to those skilled in the art. As shown in FIG. 2a, both support 52 and flux guide 48 are preferably shaped similarly to pendulum head 44 and are adjacent to all portions of the magnet 44 for the entire range of motion of the magnet head 44. In one embodiment, the support 52 can be a piece of ferrous (flux carrying) metal that provides a high permeability flux guiding path.

An electric current I is flowed through the coil 50 via electrical connections 62. As is well known to those skilled in the art, the electric current in the coil generates a magnetic field. The magnetic field from the coil then interacts with the magnetic fields generated by magnets 45 to produce a motion. The motion or torque of the magnetic head 44 is indicated by arrows 64. The magnitude or strength of the torque is dependent on the magnitude of the current that is applied to the coil. Likewise, the direction of the torque depends on the direction of the current to the coil.

Thus, by applied a desired current magnitude and direction, force can be applied to pendulum head 44, thereby applying force to pendulum shaft 42 and torque to extension member 22b. This in turn applies a force to user manipulatable object 14 in the rotary degree of freedom about axis B (and axis D). The actuator 40 thus may be provided as a substitute for other actuators such as DC motors and brakes having rotatable shafts. An actuator 40 can be provided for each degree of freedom of the user manipulatable object in which force is desired to be applied. For example, a second actuator 40 is preferably coupled to extension member 22a in a similar manner to apply forces to object 14 in the rotary degree of freedom about axes A and E. Also, other known mechanical interface devices, such as slotted yoke mechanisms or other gimbal mechanisms, can use actuator 40 to provide force feedback to a user of the interface in desired degrees of freedom.

In addition, is some embodiments the moving magnet actuator 40 can be used as a sensor. A second coil, having an appropriate number of loops, can be placed on support 52. Motion about axis B within magnetic field induces a voltage across the second coil. The voltage can be sensed across this second coil. This voltage is proportional to the rotational velocity of the magnetic head 44. From this derived velocity, acceleration or position of the pendulum head can be derived using timing information, for example, from a clock. Alternatively, the coil 50 can be used for both applying forces and sensing velocity, as described in U.S. Pat. No. 5,805,140, incorporated herein by reference.

In other embodiments, a single magnet 45 can be provided on magnet head 44, where one side of the magnet facing support 52 has one polarity, and the other side of the magnet facing flux guide 48 has the opposite polarity. In such an embodiment, two coils 50 can be placed adjacent to each other on the side of support 52 instead of the one coil 50 shown in FIG. 2b, parallel to the motion of head 44. The two coils can be placed close together, where the junction between the two coils is approximately at the center of the range of motion of the magnet head 44.

The actuator 40 has several advantages. One is that a limited angular range is defined for a particular degree of freedom of object 14 by the length of the magnetic head 44. In many interface devices, such as joysticks, such a limited angular range is desired to limit the movement of object 14. Also, the actuator 40 provides good mechanical advantage due to a large radius of the magnet head 44. Thus, when using actuators 40, a drive amplification transmission, such as a capstan drive, belt drive, or friction drive, may not be necessary to output forces with sufficient magnitude. Also, control of the actuator 40 can be simpler than other actuators since output torque is a linear function of input coil current. In addition, since actuators 40 do not require mechanical or electrical commutation as do other types of motors, the actuator 40 has a longer life expectancy, less maintenance, and quiet operation. The actuation is frictionless, resulting in greater haptic fidelity.

Furthermore, the actuator 40 has some advantages over voice coil actuators which move a coil through a magnetic field instead of moving a magnet as in the present invention. In a voice coil actuator, a circuit or wires must be provided which flex with the motion of the coil, since current is supplied to the coil from a source that is typically not moving with the coil. Such a flex circuit can be expensive since it must maintain reliability over the life over the actuator. In addition, in many configurations a moving magnet actuator such as actuator 40 can be more cost efficient and power efficient than a moving coil actuator having equivalent characteristics such as output force. Finally, a coil is more efficiently heatsinked in a moving magnet actuator than in a moving coil actuator. A coil having current flowing through it tends to build up heat, and this heat may require a large heatsink coupled to the coil to be dissipated properly. If such a heatsink is provided on a moving part with the moving coil, less efficient heatsinks are required to reduce weight and/or bulk of the moving part. However, if the magnet is moved instead of the coil, the grounded coil can be heatsinked more effectively.

In other embodiments, a linear moving magnet actuator can be used to provide forces in and detect motion in a linear degree of freedom. A linear moving-magnet actuator can include a coil wound around an inner cylindrical wall of the actuator, forming a linear channel through which a magnet head can translate, as shown in FIGS. 3a-3c.

In addition, multiple coils be coupled to support 52 to provide multiple separate "sub-coils" of wire. Each sub-coil can have its own terminals and be supplied with its own current. Since the magnetic fields from selected sub-coils will interact to create larger or smaller magnetic fields, a variety of different forces can be output by the actuator 40 with one magnitude of current. This embodiment is described in greater detail in U.S. Pat. No. 5,805,140, which is incorporated herein by reference.

Figure 3A:
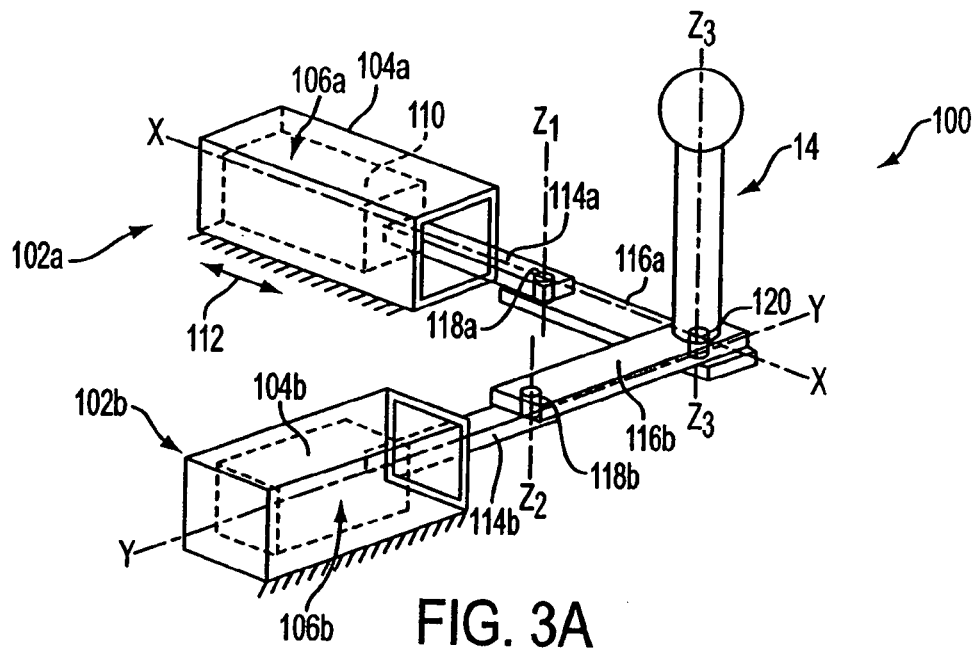
FIG. 3a is a perspective view of a second embodiment of a force feedback interface device of the present invention including a moving magnet actuator.

FIG. 3a is a perspective view of an interface system 100 in which two linear degrees of freedom are provided to user object 14 and linear moving-magnet actuators 102a and 102b are used to apply forces to the user object. A host computer, microprocessor (not shown) or other current source is preferably coupled to the actuators to apply current as desired.

Figure 3B:
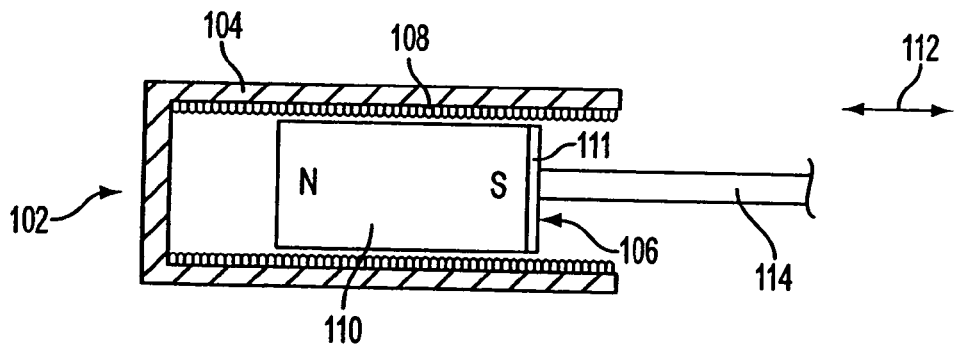
Figure 3C:
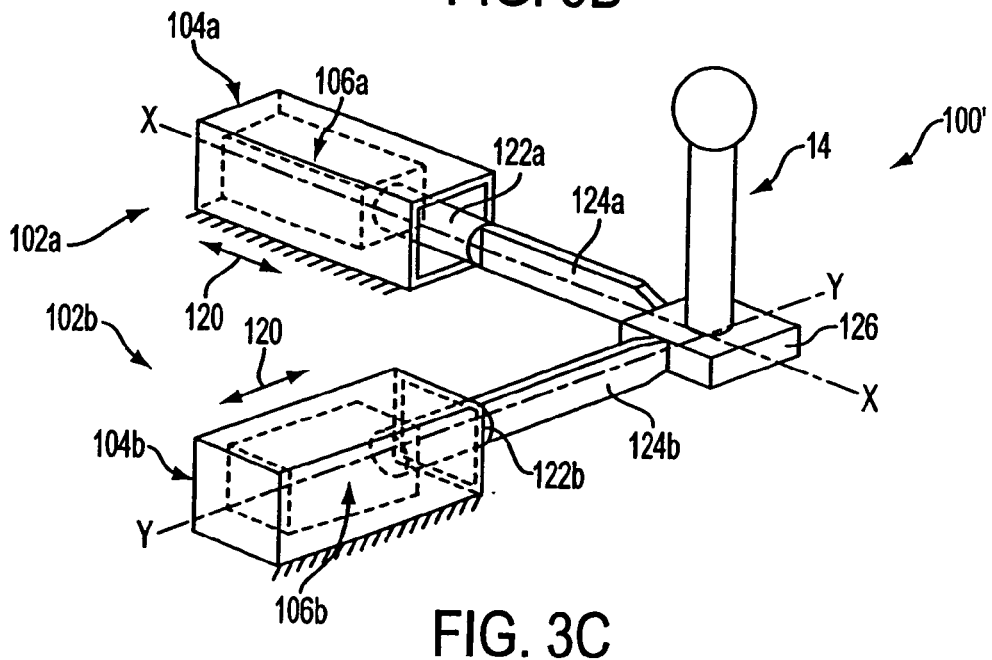

A side sectional view of an example of a linear actuator 102 is shown in FIG. 3b. Linear actuator 102 is a grounded actuator and includes a magnetic flux housing 104 and a magnet head 106. Housing 104 can be made of iron or other ferrous metal and includes a coil 108 wound on the inside of the housing 104 as shown. Magnet head 106 includes a magnet 110 oriented with north and south polarities as shown. The magnet is coupled to a support 111, which is coupled to member 114. The magnet head 106 moves within the housing 104 along a linear degree of freedom, indicated by arrows 112, when a current is flowed through coil 108, similarly as described above. The direction of the magnet head 106 depends on the direction of the applied current. In addition, the linear actuator can be used to sense the position of magnet head 106 along the linear degree of freedom by sensing velocity as described above with reference to FIGS. 2a and 2b. Alternately, separate linear motion sensors can be coupled to the object 14 or other members; such linear sensors are well known to those skilled in the art. In other embodiments, the magnet head 106 can be made longer than the housing 104. The magnet head 106 can be rectilinear as shown in FIG. 3a, or can be made cylindrical in other embodiments.

Referring back to FIG. 3a, magnet head 106a is preferably coupled to a first end of a shaft 114a, and a second end of shaft 114a is coupled to a first end of a joint member 116a. A rotary joint 118a couples shaft 114a to joint member 116a and allows joint member 116a to rotate about floating axis $Z_1$. A second end of joint member 116a is rotatably coupled to a second end of joint member 116b by a rotary joint 120. User object 14 is preferably coupled to joint member 116b (or, alternatively, 116a). Linear actuator 102b has equivalent components to actuator 102a. Shaft 114b is coupled to magnet head 106 at one end and rotatably at its other end to joint member 116b by rotary joint 118a, thus allowing member 116b to rotate about floating axis $Z_2$.

Object 14 can be translated by a user along linear axis X or linear axis Y, or along a combination of these axes. When object 14 is moved along axis X toward or away from housing 104a, then magnet head 106a, shaft 114a, and joint member 116a are correspondingly moved toward or away from housing 104a and retain the same relative position as shown in FIG. 3a. However, joint member 116b rotates about floating axis $Z_2$ and floating axis $Z_3$ in accordance with the movement of joint member 116a. Likewise, when object 14 is moved along axis Y toward or away from housing 104b, then magnet head 106b, shaft 114b, and joint member 116b are correspondingly moved toward or away from housing 104b and retain the relative positions as shown in FIG. 3a. Joint member 116a rotates about floating axes $Z_1$ and $Z_3$ in accordance with the movement of joint member 116b. When object 14 is moved simultaneously along both axes X and Y (e.g., object 14 is moved diagonally), then both joint members 116a-and 116b rotate about their respective axes and axis $Z_3$.

In the described embodiment, one joint member 116a is coupled under shaft 114a and the other joint member 116b is coupled over shaft 114b. Alternatively, the shafts and joint members can be coupled together in many different configurations.

FIG. 3c is a schematic diagram of an alternate embodiment 100' of the interface system 100 shown in FIG. 3a. In FIG. 3c, two linear actuators 102a and 102b as shown in FIG. 3a are included to apply forces and sense positions in two linear degrees of freedom to object 14. As in FIG. 3a, coil heads 106a and 106b translate along linear degrees of freedom, indicated by arrows 120, within housings 104a and 104b, respectively. Current can be applied by the host computer or other source to apply force to the magnet heads or sense velocity.

Shaft 122a is coupled to a flexible member 124a. Flexible members 124a and 124b are preferably made of a resilient material such as flexible plastic, rubber, metal, or the like. Flexible members 124a and 124b are preferably narrow in the dimension that the member is to bend, and wide in the dimensions in which the member is to remain rigid. Shaft 122a is a rigid member that couples member 124a to magnet head 106a, and can be provided with different lengths in different embodiments. Flexible member 124a is rigidly coupled to an object member 126 at the other end of the flexible member. Member 126 can be a part of object 14 or a platform or other base for supporting object 14. Shaft 122b is coupled to member 126 and object 14 through flexible member 124b in a similar manner.

Object 14 can be moved by a user along linear axis X or linear axis Y. Flexible members 124a and 124b flex (bend) appropriately as the object is moved. For example, if object 14 and member 126 are moved along axis X, flexible member 124a does not bend since the direction of movement is directed down (substantially parallel to) the longitudinal axis of flexible member 124a. However, since housing 104b is grounded and fixed in place relative to object 14, flexible member 124a bends toward or away from actuator 102a (depending on the object's direction along axis X) to allow the translation of object 14. This occurs when the direction of movement of object 14 is substantially perpendicular to the longitudinal axis of flexible member 124a. Likewise, when object 14 is translated along axis Y in the other linear degree of freedom, flexible member 124b does not flex since the direction of movement is directed substantially parallel to its longitudinal axis. Flexible member 124a, however, bends toward or away from actuator 102b to allow the translation of object 14. When object 14 is moved simultaneously along both axes X and Y (e.g., object 14 is moved diagonally), then both flexible members 124a and 124b flex in conjunction with the movement. It should be noted that the flexible members 124a and 124b do not need to twist (i.e. provide torsion flex).

Figure 4A:
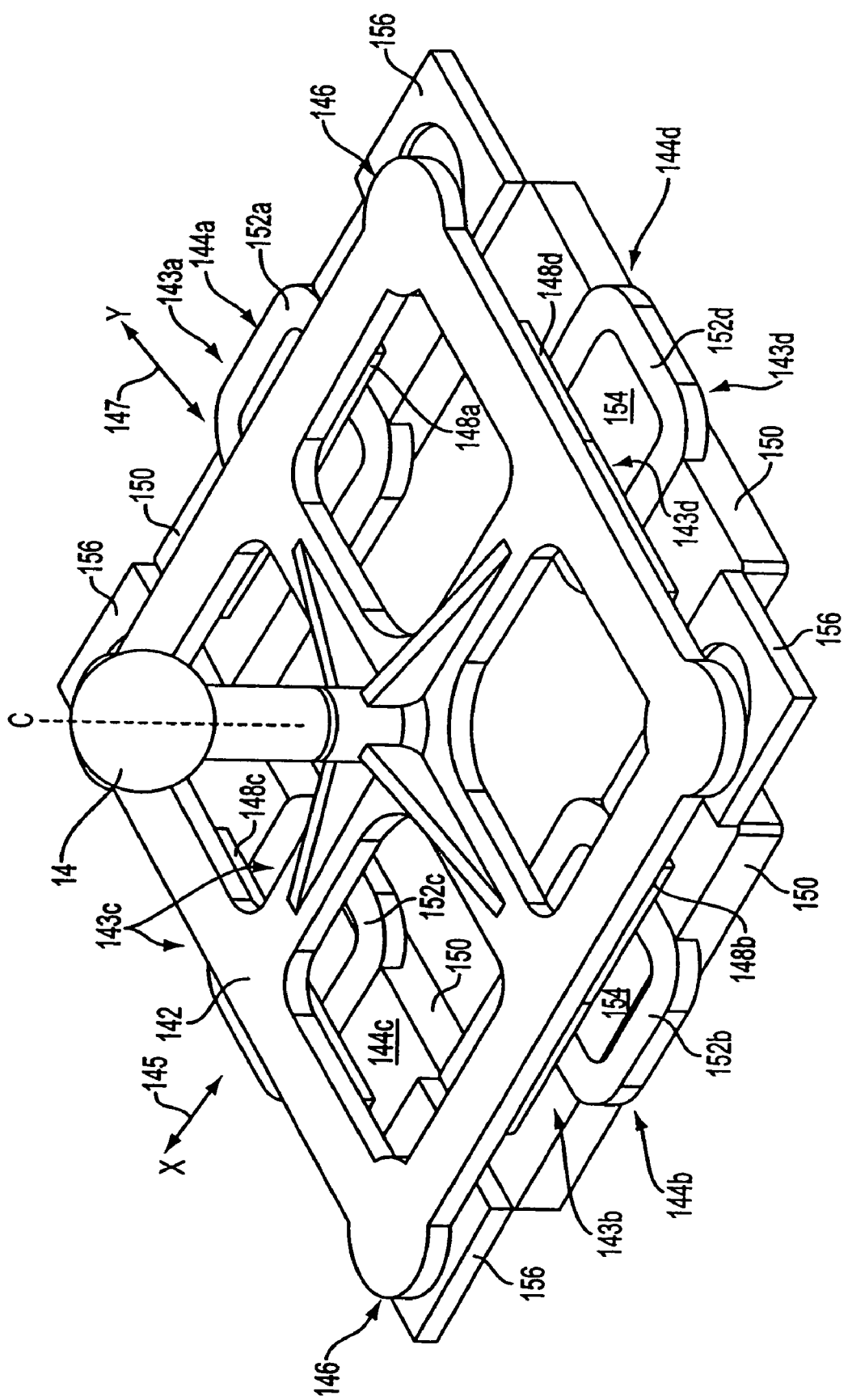
FIG. 4a is a perspective view of a third embodiment of a force feedback interface device of the present invention including a moving magnet actuator.

FIG. 4a is a perspective view of another embodiment 140 of the present invention for a force feedback device including a moving magnet actuator. Embodiment 140 includes a user manipulatable object 14, a magnet frame 142, actuators 143 including magnets 148 and coil portions 144, and bearings 146. User object 14 is provided with two linear, planar degrees of freedom in the apparatus shown.

User manipulatable object 14 is rotatably coupled to magnet frame 142. The user object 14 can preferably be rotated about an axis C so that the frame 142 will not be rotated by the user. The motion about axis C can be sensed by a sensor and/or actuated by an actuator, in various embodiments.

Magnet frame 142 includes a portion of a bearing 146 at each corner, which is described in greater detail below. Frame 142 also is coupled to multiple magnets 148, where four magnets 148 are provided, one on each side of frame 142. Magnets 148 are each provided above an associated coil portion 144, which includes a grounded piece 150 made of a metal such as iron, and a coil 152 wrapped around a central projection ("pole piece") 154 of the grounded piece 150. The coil 152 preferably is wrapped several times around the projection 154, e.g. 100 to 200 times. Magnet frame 142 is also coupled to a ground 156 by bearings 146, which allow the frame 142 to translate with respect to ground 52 and coil portions 144. Ground 156 can be any surface, member, housing, etc. that remains fixed with reference to the moving frame 142. It should be noted that sensors are omitted from the view shown in FIG. 4a; sensors are described in greater detail with respect to FIG. 4c. Preferably, stops (not shown) such as pins can be provided to prevent movement of frame 142 past desired limits in both degrees of freedom.

The magnetic actuators 143 produce a linear force on frame 142 in a direction parallel to axes X and Y, as shown by arrows 145 and 147, respectively. The frame 142 is subject to force output by actuators 143a and 143b parallel to axis X until magnets 148a and 148b are moved out from over the coils 152a and 152b, respectively. Likewise, the frame 142 is subject to force output by actuators 143c and 143d parallel to axis Y until magnets 148c and 148d, respectively, are moved out from over the coils 152c and 152d, respectively. Preferably, physical stops are provided to limit the motion of frame 142 before the magnets are moved fully away from the coils.

In the embodiment shown, four actuators are provided, two for each degree of freedom, where actuator pair 143a and 143b provide force in the X-axis degree of freedom, and actuator pair 143c and 143d provides force in the Y-axis degree of freedom. Since a pair of actuators for a degree of freedom are provided on opposite sides of frame 142, there is the possibility that if one actuator in the pair outputs a force of one magnitude and the opposite actuator outputs a force of different magnitude, then a torque will be produced on the frame 142, causing the frame to rotate. To prevent such rotation, each actuator in a pair should be provided with the same magnitude of current in coil 152, causing the same magnitude and direction of force. For example, each actuator in the pair can be provided with one-half the current so that each actuator outputs one-half the desired force magnitude (½ F) in the same direction in a degree of freedom, thus summing to the total desired force magnitude F. Additionally, or in other embodiments, flexible frames, supports, anti-rotation flexures, or other members can couple the frame 142 to ground 152 to prevent such rotation; such a flexure can also provide a restoring force through the frame to object 14 to bring the object 14 back to a center position in the degrees of freedom. Examples of such supports are described in U.S. Pat. No. 5,805,140.

In other embodiments, only one actuator need be provided for each degree of freedom. For example, one half of the frame 142 need only be used, where the two actuators are positioned orthogonal and connected by an L-shaped piece. Such an L-shaped piece is described in greater detail in U.S. Pat. No. 5,805,140, incorporated herein by reference. Furthermore, rotary motion of a user object 14 can be converted to the linear motion of frame 142 using a ball socket or similar joint, as described in U.S. Pat. No. 5,805,140.

Figure 4B:
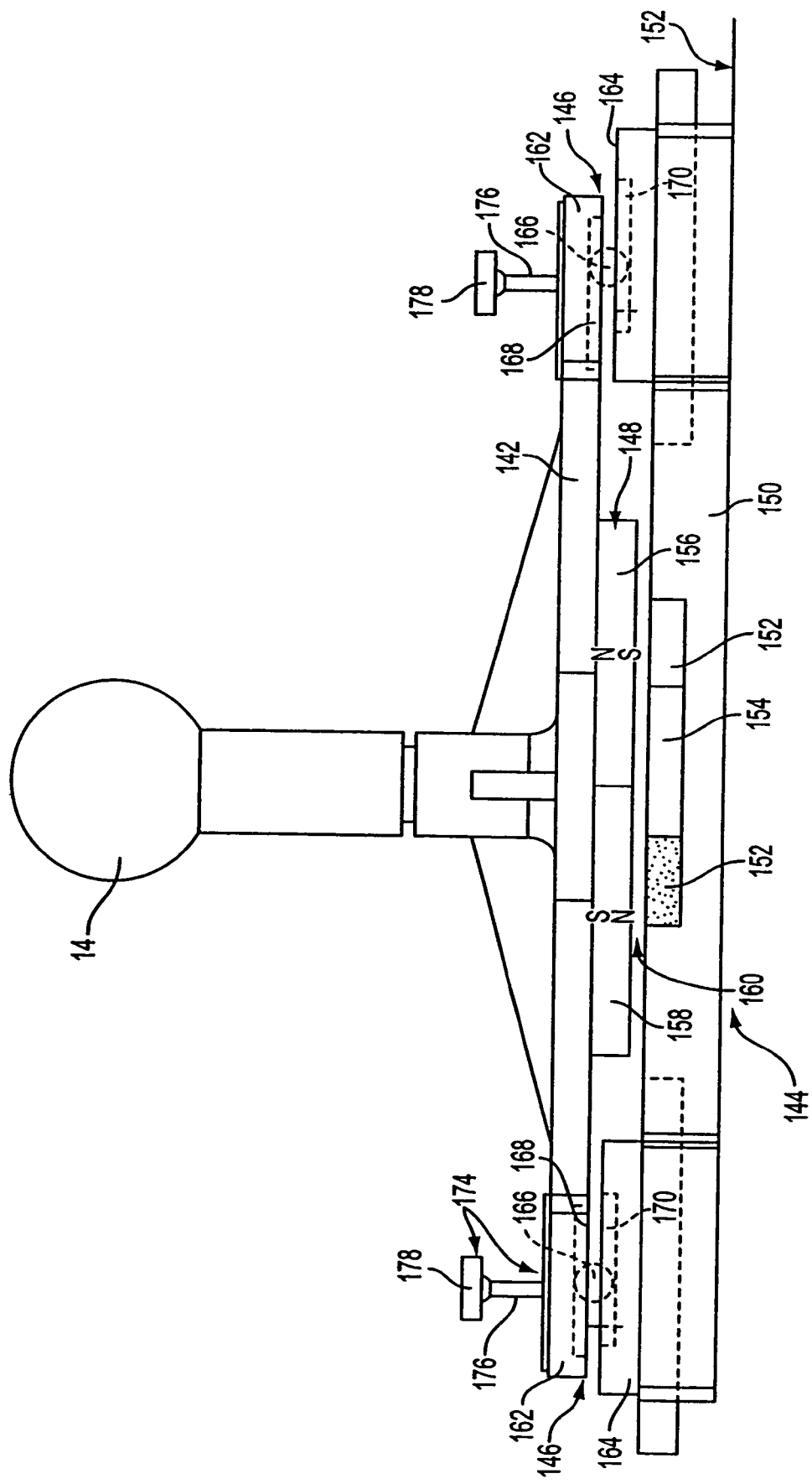

FIG. 4b is a side elevational view of the force feedback device embodiment 140 of FIG. 4a. Magnet 148 is shown coupled to the underside of frame 142. Magnet 148 preferably has two oppositely-polarized halves, where one half 156 has a south pole nearest to coil 152, and the other half 158 has a north pole nearest to coil 152. Preferably, only a small gap 160 is provided between the magnets 148 and the coil 152. Frame 142 provides a flux path for the magnetic field of magnets 148. The coil 152 is wrapped around the projection 154, which, along with the rest of grounded piece 150, also provides a flux return path. Projection 154 is similar to portion 53 described with reference to FIG. 2b. An actuator operating in a similar fashion is described in U.S. Pat. No. 5,136,194 by Oudet et al. In alternate embodiments, a metal plate can be provided just above magnets 148 to provide the flux path, while the remaining portion of frame 142 can be, for example, molded plastic or other non-metallic material. The host computer (or local microprocessor) can control the direction and/or magnitude of the current in wire coil 152. In alternate embodiments, additional coils can be provided on projection 154 for sensing velocity and/or implementing the sub-coils described above.

Bearings 146 are also shown in FIG. 4b, where one portion 162 of the bearing is coupled to frame 142, and the other portion 164 of the bearing is coupled to ground 152. A ball 166 is provided between portions 162 and 164. The ball 166 rolls between an indentation 168 of portion 162 and an indentation 170 of portion 164 as the frame 142 is translated by the user. The indentations are circular shaped and have a diameter at least as wide as is desired for the amount of linear motion of the user object in either degree of freedom (one bearing 146 is used for both planar degrees of freedom). The rolling action provides smooth movement for the frame 142. The bearing 146 is preloaded by the magnetic force attraction between coil and magnet, and which holds the bearings 146 together.

Also shown in FIG. 4b is a sensor 174, which in the described embodiment is an optical sensor such as a phototransistor or photodiode sensor. Sensor 174 can include a rectangular reflective area (shown in FIG. 4c) positioned on the top surface of frame 142 onto which a beam of energy 176 is emitted from a grounded emitter/detector 178. The beam is reflected back to the detector portion of the emitter detector 118. The position of the frame 142, and thus the position of object 14, can be determined by counting a number of pulses that have moved past the detector, as described in greater detail below. In other embodiments, the area on frame 142 can be a detector, which can determine the location of a beam emitted by an emitter in the position of emitter/detector 178. Alternatively, other types of sensors can be used, such as an optical encoder or analog potentiometer having a rotating shaft coupled to a roller that is frictionally engaged (e.g., engaged using gear teeth or a friction wheel) with the frame 142.

Figure 4C:
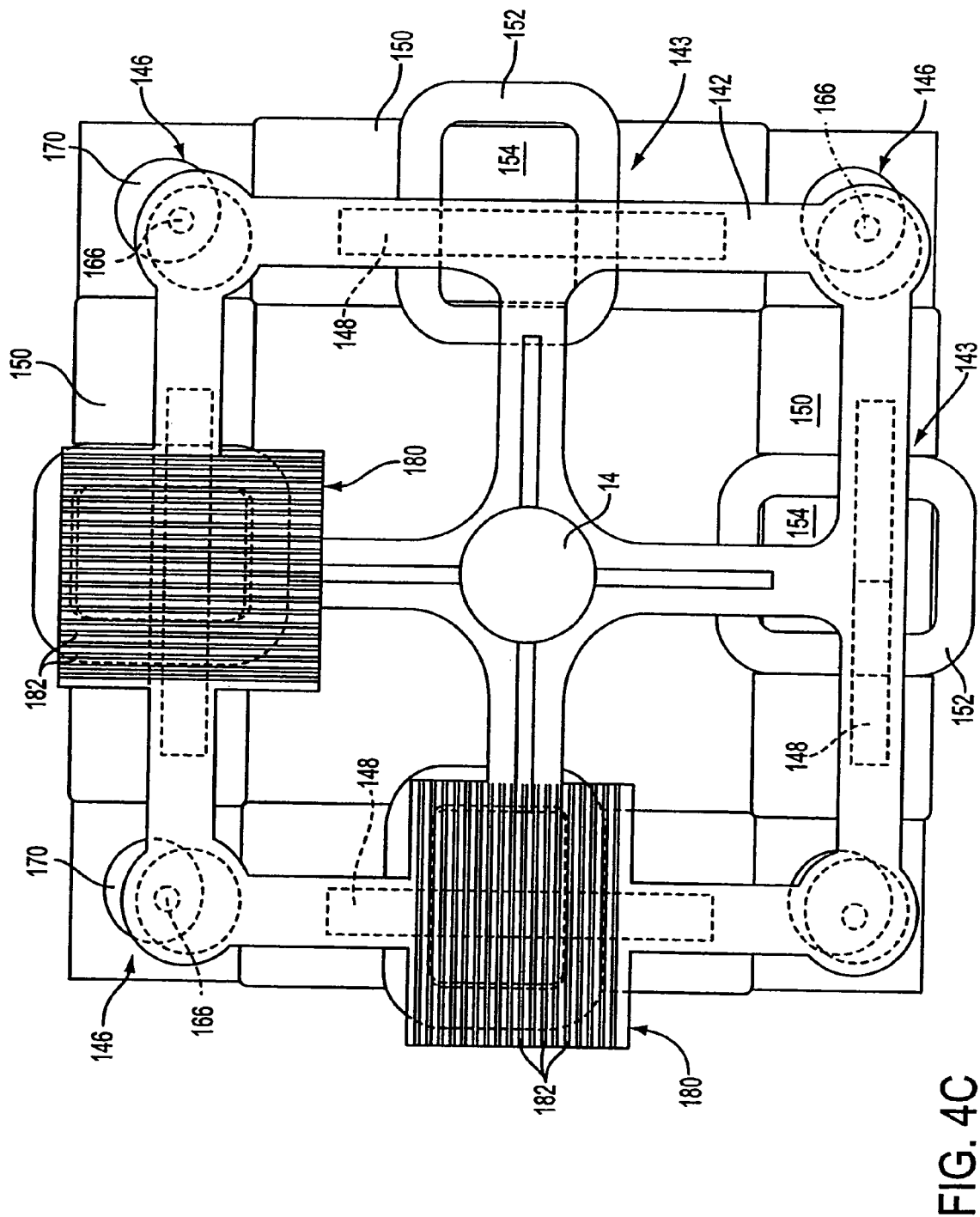

FIG. 4c is a top plan view of the force feedback device embodiment 140 of FIG. 4a, in which a portion of sensor 174 is also shown. In the described embodiment, a sensed portion 180 of the frame 142 is provided below the emitter/detector 178 (shown in FIG. 4b). Only two sensed portions 180 are required to detect motion in two degrees of freedom. Sensed portion 180 includes a series of regularly-spaced reflective strips 182, where the material between the strips is non-reflective. The emitter/detector 178 emits a beam onto the portion 180, such that if a reflective strip 182 is impinged by the beam, the beam will be reflected back to the detector portion of the emitter/detector, and thus detected. If the beam impinges on a non-reflective portion, then the beam is not detected by the detector of the emitter/detector. Thus, when the portion 180 moves under the beam as the frame 142 is moved by the user and/or by actuators 102, a number of reflective strips 182 are moved past the detector and are detected. By counting the number of reflective strips passing by the detector, the amount of movement is known. The reflective strips are preferably much thinner and closely spaced than shown in FIG. 4c to provide greater sensing resolution. In other embodiments, the sensed portion 180 can be positioned at other areas of the frame 142. Furthermore, a quadrature encoder is preferably used, where the emitter detector 178 includes two detectors to create 90 degree phase-shifted signals (quadrature) to provide displacement and direction information, as is well known to those skilled in the art. Additional detectors can also be used, e.g. for "octature" sensing using three or more detectors for increased sensing resolution, as described in greater detail in copending U.S. patent application Ser. No. 09/071,136, filed Apr. 30, 1998 and incorporated herein by reference.

In other embodiments, an emitter and detector can be placed on opposite sides of portion 180 that has slots similar to strips 182 that let the beam pass through to the detector. Such optical encoders are well known to those skilled in the art. In still other embodiments, other types of sensors can be used. A separate sensor can be provided for the motion of object 14 along axes X and Y, or a single sensor can be used to detect motion in both degrees of freedom. For example, a rectangular detector that senses the two dimensional position of an impinging beam can be placed underneath the frame 142 below the user object 14, where the beam emitter is coupled to the underside of the frame 142 (or the emitter and detector positions can be reversed). Furthermore, other types of sensors as described above can also be used.

In an alternate embodiment, instead of the linear embodiment of FIGS. 4a-4c, a spherical or partially-spherical magnet can be used in a moving-magnet actuator that provides rotary force to a user manipulatable object. For example, a bowl-shaped iron base can be provided with one or more coils on the inner surface of the bowl having projections (pole pieces) in the middle of the coils similar to projection 53 or 154. The coils are preferably recessed similarly to coil 50 shown in FIG. 2b. A magnet having a spherical edge, such as a bowl-shaped magnet, can be positioned to move rotationally within the base adjacent to the coils so that a force may be applied to the magnet using the magnetic fields of the coils and magnet. For example, a small gap can be provided between coils and magnet. Another iron or metal piece can be provided on the other side of the magnet (such as within the bowl of the magnet) to provide a flux return path. In one embodiment, for example, a joystick can be coupled to the magnet and extended up through the inner portion of the magnet bowl. The joystick is thus provided with two rotary degrees of freedom as the magnet rotates within the base and is provided with force feedback in those rotary degrees of freedom when current is supplied to the one or more coils.

Figure 5:
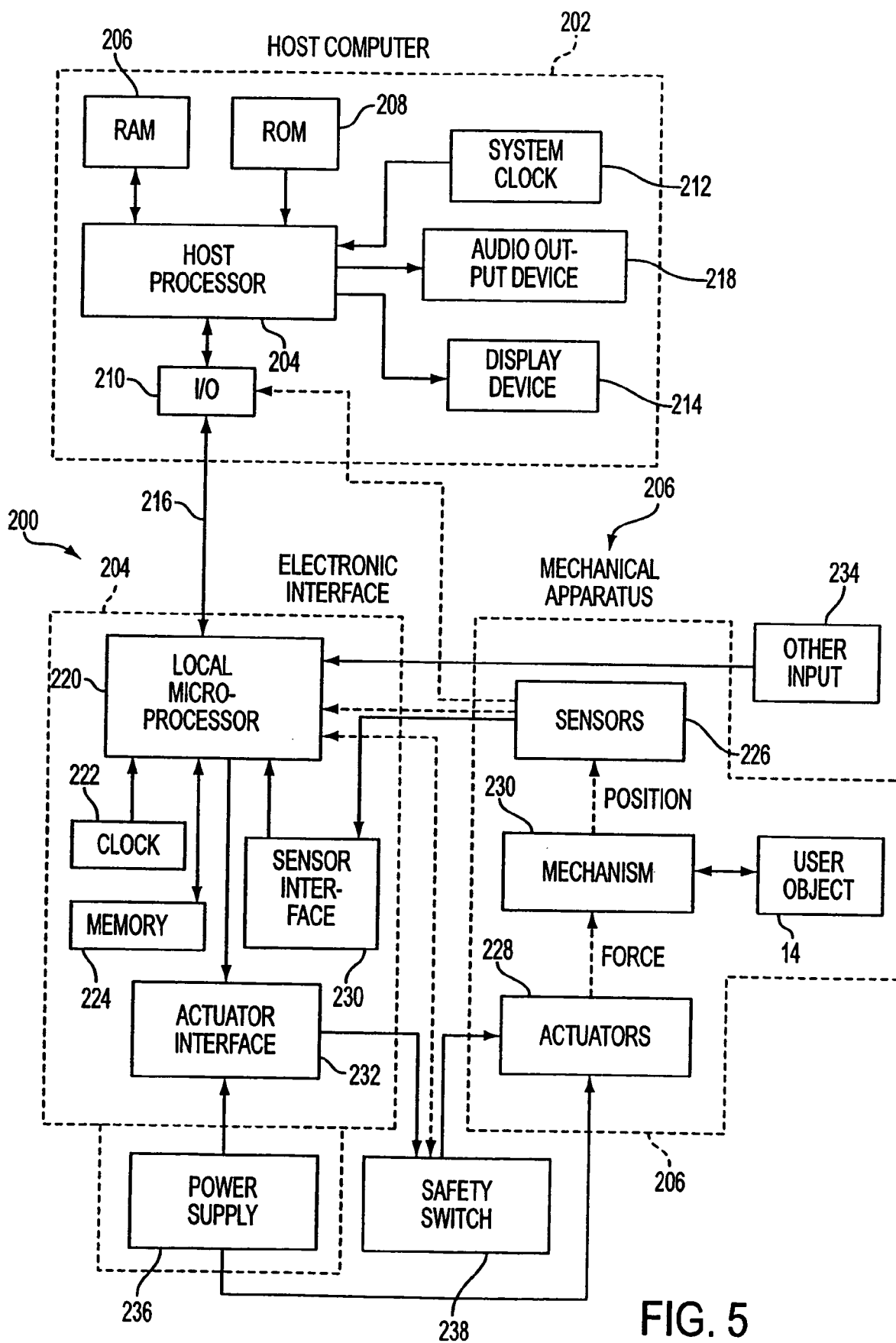
FIG. 5 is a block diagram of a host computer and interface device of the present invention.

FIG. 5 is a block diagram illustrating an embodiment of a force feedback interface device 200 and host computer 202 suitable for use with the present invention. Interface device 200 includes an electronic interface 204, mechanical apparatus 206, and user object 14. A similar system is described in detail in U.S. Pat. No. 5,734,373 which is hereby incorporated herein by reference in its entirety.

The computer 202 can be a personal computer or workstation, such as an IBM-PC compatible computer, Macintosh personal computer, or a SUN or Silicon Graphics workstation. Most commonly, the digital processing system is a personal or portable computer which operates under the Windows™, Unix, MacOS, or other operating system and may include a host microprocessor such as a Pentium class microprocessor, PowerPC, DEC Alpha, or other type of microprocessor. Alternatively, host computer system 202 can be one of a variety of home video game systems commonly connected to a television set, such as systems available from Nintendo, Sega, or Sony. In other embodiments, host computer system 202 can be a "set top box" which can be used, for example, to provide interactive television functions to users, or a "network-" or "internet-computer" which allows users to interact with a local or global network using standard connections and protocols such as used for the Internet and World Wide Web.

Host computer 202 preferably implements a host application program with which a user is interacting via user object 14 and other peripherals, if appropriate, and which can include force feedback functionality. The software running on the host computer 202 may be of a wide variety. For example, the host application program can be a simulation, video game, Web page or browser that implements HTML or VRML instructions, scientific analysis program, virtual reality training program or application, or other application program that utilizes input of user object 14 and outputs force feedback commands to the user object 14. For example, many game application programs include force feedback functionality and may communicate with the force feedback interface device 200 using a standard protocol/drivers such as I-Force® or TouchSense™ available from Immersion Corporation. Herein, computer 202 may be referred as displaying "graphical objects" or "computer objects." These objects are not physical objects, but are logical software unit collections of data and/or procedures that may be displayed as images by computer 202 on display screen 214, as is well known to those skilled in the art. A displayed cursor or a simulated cockpit of an aircraft might be considered a graphical object.

Host computer 202 commonly includes a host microprocessor 204, random access memory (RAM) 206, read-only memory (ROM) 208, input/output (I/O) electronics 210, a clock 212, and display device 214. Host microprocessor 204 can include a variety of available microprocessors from Intel, Motorola, AMD, Cyrix, or other manufacturers. Microprocessor 400 can be single microprocessor chip, or can include multiple primary and/or co-processors and preferably retrieves and stores instructions and other necessary data from RAM 206 and ROM 208 as is well known to those skilled in the art. In the described embodiment, host computer system 202 can receive sensor data or a sensor signal via bus 216 from sensors of mechanical apparatus 206 and other information. Host computer 202 can also output "host commands" to the interface via bus 216 to cause force feedback for the interface device.

Clock 212 is a standard clock crystal or equivalent component used by host computer 202 to provide timing for electrical signals used by microprocessor 204 and other components of the computer. Display device 214 can be included in host computer 202 and can be a standard display screen (LCD, CRT, etc.), 3-D goggles, or any other visual output device. Typically, the host application provides images to be displayed on display device 214 and/or other feedback, such as auditory signals. For example, display device 214 can display images from a game program. Audio output device 218, such as speakers, can be coupled to host microprocessor 204 via amplifiers, filters, and other circuitry well known to those skilled in the art. Other types of peripherals can also be coupled to host processor 204, such as storage devices (hard disk drive, CD ROM drive, floppy disk drive, etc.), printers, and other input and output devices.

Electronic interface 204 is coupled to host computer 202 by a bi-directional bus 216. The bi-directional bus sends signals in either direction between host computer 202 and interface device 200. Bus 216 can be a serial interface bus, such as USB, RS-232, MDI, IrDA, or Firewire (IEEE 1394), providing data according to a serial communication protocol, a parallel bus using a parallel protocol, or other types of buses. An interface port of host computer 202, such as a USB or RS232 serial interface port, connects bus 216 to host computer 202. In a different embodiment bus 216 can be connected directly to a data bus of host computer 202 using, for example, a plug-in card and slot or other access of computer 202.

Electronic interface 204 includes a local microprocessor 220, local clock 222, local memory 224, optional sensor interface 230, an optional actuator interface 232, and other optional input devices 234. Interface 204 may also include additional electronic components for communicating via standard protocols on bus 216. In various embodiments, electronic interface 204 can be included in mechanical apparatus 206, in host computer 202, or in its own separate housing. Different components of interface 204 can be included in device 200 or host computer 202 if desired.

Local microprocessor 220 is coupled to bus 216 and communicates with host computer 202. Processor 220 is considered "local" to interface device 200, where "local" herein refers to processor 220 being a separate microprocessor from any processors in host computer 202. "Local" also preferably refers to processor 220 being dedicated to force feedback and sensor I/O of interface device 200, and being closely coupled to sensors 226 and actuators 228, such as within or coupled closely to the housing for interface device 200. Microprocessor 220 can be provided with software instructions to wait for commands or requests from computer 202, parse or decode the command or request, and handle/control input and output signals according to the command or request. In addition, processor 220 preferably operates independently of host computer 202 by reading sensor signals, calculating appropriate forces from those sensor signals, time signals, and a subroutine or "force process" in accordance with a host command, and outputting appropriate control signals to the actuators. Suitable microprocessors for use as local microprocessor 220 include the I-Force Processor from Immersion Corp., the 8X930AX by Intel, the MC68HC711E9 by Motorola and the PIC16C74 by Microchip, for example. Microprocessor 220 can include one microprocessor chip, or multiple processors and/or co-processor chips. In other embodiments, microprocessor 220 can includes digital signal processor (DSP) functionality. In yet other embodiments, digital circuitry, state machine, and/or logic can be provided instead of a microprocessor to control actuators 228.

For example, in one host-controlled embodiment that utilizes microprocessor 220, host computer 202 can provide low-level force commands over bus 216, which microprocessor 220 directly transmits to the actuators. In a different local control embodiment, host computer system 202 provides high level supervisory commands to microprocessor 220 over bus 216, and microprocessor 216 manages low level force control loops to sensors and actuators in accordance with the high level commands and independently of the host computer 202. In the local control embodiment, the microprocessor 220 can process inputted sensor signals to determine appropriate output actuator signals by following the instructions of a "force process" that may be stored in local memory 224 and includes calculation instructions, formulas, force magnitudes, or other data. The force process can command distinct force sensations, such as vibrations, textures, jolts; or even simulated interactions between displayed objects. For instance, the host can send the local processor 220 a spatial layout of objects in the graphical environment so that the microprocessor has a mapping of locations of graphical objects and can determine force interactions locally. Force feedback used in such embodiments is described in greater detail in U.S. Pat. Nos. 5,734,373 and 6,078,308, both of which are incorporated by reference herein. Microprocessor 220 can also receive commands from any other input devices 234 included in interface device 200 and provides appropriate signals to host computer 202 to indicate that the input information has been received and any information included in the input information. For example, buttons, switches, dials, or other input controls associated with interface device 202 can provide signals to microprocessor 220. Another variation may consist of dedicated subcircuits and specialized or off-the-shelf chips which read the input devices, monitor the sensors 226, determine angles, and handle communications with the host computer 202, all without software or a microprocessor 220.

A local clock 222 can be coupled to the microprocessor 220 to provide timing data, similar to system clock 212 of host computer 202; the timing data might be required, for example, to compute forces output by actuators 228. Local memory 224, such as RAM and/or ROM, is preferably coupled to microprocessor 220 in interface device 200 to store instructions for microprocessor 220 and store temporary and other data. Microprocessor 220 may also store calibration parameters and the state of the force feedback device in a local memory 224.

Sensor interface 230 may optionally be included in electronic interface 204 to convert sensor signals to signals that can be interpreted by the microprocessor 220 and/or host computer. For example, sensor interface 230 can receive and convert signals from a digital sensor such as an encoder or from an analog sensor using an analog to digital converter (ADC). Such circuits, or equivalent circuits, are well known to those skilled in the art. Alternately, microprocessor 220 can perform these interface functions or sensor signals from the sensors can be provided directly to host computer 202. Actuator interface 232 can be optionally connected between the actuators of interface device 200 and local microprocessor 220 to convert signals from microprocessor 220 into signals appropriate to drive the actuators. Actuator interface 232 can include power amplifiers, switches, digital to analog controllers (DACs), and other components well known to those skilled in the art.

Microprocessor 220 and/or host computer 202 can command specific current magnitude and direction to the moving magnet actuators 228 to apply desired forces to object 14. This can be accomplished using voice coil driver chips that can be provided, for example, in actuator interface 232. These chips typically include a self-contained transconductance amplifier, with a current control feedback loop, to output current to a voice coil actuator, and will operate with the actuators of the present invention. A suitable voice coil driver chip includes a switchable transconductance gain circuit that allows the user to choose between two different voltage-to-current gains. When smaller, more fine forces are to be output, the gain can be switched from a high gain to a low gain, thus decreasing the current step size. This increases the resolution of the DAC used to drive the voice coil driver. With a greater resolution, the DAC can more finely and accurately control the forces felt by the user. This fine control, however, provides a smaller range of possible forces that can be output. Thus, when a larger range of forces is desired, the gain can be switched back to the larger gain. The gain switching can be implemented using a control line from the microprocessor 220 or computer 202 to the voice coil driver chip. Suitable voice coil driver chips include the Siliconex Si9961 (with gain control), the Allegro 8932-A (with gain control), the Allegro 8958 (no gain control), and the Unitrode UC3176 (no gain control). The operation and implementation of these drivers is well known to those skilled in the art.

Other input devices 234 can optionally be included in the housing for interface device 200 and send input signals to microprocessor 220 and/or host computer 202. Such input devices can include buttons, dials, switches, or other mechanisms. For example, in embodiments where user object 14 is a joystick, other input devices 234 can include one or more buttons provided, for example, on the joystick handle or base and used to supplement the input from the user to a game or simulation. Also, dials, switches, voice recognition hardware (and/or voice recognition software implemented by microprocessor 220 or host 202), or other input mechanisms can be used. The operation of such input devices is well known to those skilled in the art.

Power supply 236 can optionally be coupled to actuator interface 232 and/or actuators 228 to provide electrical power. Actuators 228 typically require a separate power source to be driven. Power supply 236 can be included within the housing of interface device 200, or can be provided as a separate component, for example, connected by an electrical power cord. Alternatively, if the USB or a similar communication protocol is used, actuators and other components can draw power from the USB from the host computer. Alternatively, power can be stored and regulated by interface device 200 and thus used when needed to drive actuators 228.

Safety or "deadman" switch 238 is preferably included in interface device to provide a mechanism to allow a user to override and deactivate actuators 228, or require a user to activate actuators 228, for safety reasons. For example, the user must continually activate or close safety switch 238 during manipulation of user object 14 to activate the actuators 228; If, at any time, the safety switch is deactivated (opened), power from power supply 236 is cut to actuators 228 (or the actuators are otherwise deactivated) as long as the safety switch is open. Embodiments of safety switch 238 include an optical safety switch, electrostatic contact switch, hand weight safety switch, etc. The safety switch can also be implemented in firmware or software for local microprocessor 220.

Mechanical apparatus 206 is coupled to electronic interface 204 and preferably includes sensors 226, actuators 228, and mechanism 230. One embodiment of mechanical apparatus 206 is mechanical system 10 of FIG. 1.

Sensors 226 sense the position, motion, and/or other characteristics of user object 14 along one or more degrees of freedom and provide signals to microprocessor 220 including information representative of those characteristics. Typically, a sensor 226 is provided for each degree of freedom along which object 14 can be moved. Alternatively, a single compound sensor can be used to sense position or movement in multiple degrees of freedom. Examples of sensors suitable for several embodiments described herein include digital optical rotary encoders, linear optical encoders, potentiometers, phototransistor sensors, photodiode sensors, or other optical sensors, non-contact sensors such as Polhemus (magnetic) sensors, the encoder sensor 174 of FIG. 4b, magnetorestrictive sensors, magnetoresistive sensors, Inductosyns® sensors, etc. In addition, velocity sensors (e.g., tachometers) and/or acceleration sensors (e.g., accelerometers) can be used. Furthermore, either relative or absolute sensors can be employed.

Actuators 228 transmit forces to user object 14 of mechanical apparatus 206 in one or more directions along one or more degrees of freedom in response to signals received from microprocessor 220, and/or host computer 202, i.e., they are "computer controlled." Typically, an actuator 228 is provided for each degree of freedom along which forces are desired to be transmitted. In other embodiments, the actuators can instead or additionally transmit forces to the housing of the interface device which are then transmitted to the user through physical contact with the housing, e.g. the user is holding the housing of the device, such as a gamepad controller. Actuators 228 preferably each include a moving magnet and coil and can be any of the actuator embodiments 40, 102, or 143 described above.

Mechanism 230 can be one of several types of mechanisms. One type of mechanism is the gimbal mechanism 12 and mechanical system 10 shown in FIG. 1. Other mechanisms may also be used, such as slotted bail mechanisms. Other types of mechanisms and related features are disclosed in U.S. Pat. Nos. 5,576,727; 5,731,804; 5,721,566; 5,691, 898; 5,828,197; 6,028,593; 6,100,874; 6,020,875; 6,166,723; 6,104,382; and 5,767,839, all hereby incorporated by reference herein in their entirety.

A user manipulatable object (or "manipulandum") 14 is grasped by the user in operating the device 200. It will be appreciated that a great number of other types Of user objects can be used with the method and apparatus of the present invention. In fact, the present invention can be used with any mechanical object where it is desirable to provide a human-computer interface with two to six degrees of freedom. Such objects may include a joystick, stylus, mouse, steering wheel, gamepad, remote control, sphere, trackball, or other grips, finger pad or receptacle, surgical tool used in medical procedures, catheter, hypodermic needle, wire, fiber optic bundle, screw driver, pool cue, fishing pole, etc.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention.

What is claimed is:

1. A device, comprising:
a frame coupled to a ground surface by a plurality of bearings;
a manipulatable object coupled to the frame and moveable in at least one degree of freedom;
at least one sensor configured to output a sensor signal based on a position of the manipulatable object; and
an actuator configured to output a force in response to receiving a force feedback signal, the actuator including a magnet and a grounded coil, the magnet coupled to the frame, the actuator configured to produce the force when the grounded coil is energized with a current, the grounded coil coupled to the ground surface.

2. The device of claim 1, further comprising a local processor configured to receive host commands from a host processor, the local processor configured to output the force feedback signal to the actuator.

3. The device of claim 1, wherein the manipulatable object is configured to move in at least two linear degrees of freedom.

4. The device of claim 1, the actuator being a first actuator, the device further comprising a second actuator coupled to the manipulatable object and configured to output a force feedback in a second degree of freedom different from the first degree of freedom, the force feedback associated with the second degree of freedom being different from the force feedback associated with the first degree of freedom, the first degree of freedom and the second degree of freedom defining a plane.

5. The device of claim 1, wherein the sensor is an optical sensor.

6. A device, comprising:
a frame coupled to a ground surface by a plurality of bearings;
a manipulatable object coupled to the frame and moveable in at least two linear degrees of freedom;
at least one sensor configured to output a sensor signal based on a position of the manipulatable object; and
a plurality of actuators configured to output a force to the manipulatable object, each actuator from the plurality of actuators including a magnet and a grounded coil, the magnet coupled to the frame, the actuator to produce the force feedback when the grounded coil is energized with a current, the grounded coil for each actuator from the plurality of actuators coupled to the ground surface.

7. The device of claim 6, wherein the frame comprises a plurality of indentations and wherein each bearing from the plurality of bearings includes a ball, a portion of each ball being positioned in one of the plurality indentations, each ball being configured to allow movement of the frame in the two planar degrees of freedom.

8. The device of claim 6, wherein the magnet of each actuator from the plurality of actuators is coupled to the frame, the coil of each actuator from the plurality of actuators is disposed around a projection, the projection extending approximately perpendicular to the plane defined by the two linear degrees of freedom.

9. The device of claim 6, wherein the plurality of actuators comprises a first actuator and a second actuator, the first actuator configured to output a force feedback in a first degree of freedom and the second actuator configured to output a force feedback in a second degree of freedom different from the first degree of freedom.

* * * * *

UNITED STATES PATENT AND TRADEMARK OFFICE
CERTIFICATE OF CORRECTION

| | |
|---|---|
| PATENT NO. | : 7,944,433 B2 |
| APPLICATION NO. | : 10/794053 |
| DATED | : May 17, 2011 |
| INVENTOR(S) | : Bruce M. Schena et al. |

It is certified that error appears in the above-identified patent and that said Letters Patent is hereby corrected as shown below:

On Title Page 3, Item (56), Please insert -- 6,160,489  12/2000 Perry et al. --.

On Title Page 3, Item (56), Please insert -- 6,111,577  8/2000 Ziles et al. --.

On Title Page 3, Item (56), Please insert -- 5,690,582  11/1997 Ulrich et al. --.

On Title Page 3, Item (56), Please insert -- 5,575,761  11/1996 Hajianpour --.

On Title Page 3, Item (56), Please insert -- 5,437,607  8/1995 Taylor --.

On Title Page 3, Item (56), Please insert -- 5,438,622  7/1995 Gulman et al. --.

On Title Page 3, Item (56), Please insert -- 5,283,970  2/1994 Aigner --.

On Title Page 3, Item (56), Please insert -- 5,186,695  2/1993 Mangseth et al. --.

On Title Page 3, Item (56), Please insert -- 5,175,459  12/1992 Danial et al. --.

On Title Page 3, Item (56), Please insert -- 5,165,897  11/1992 Johnson --.

On Title Page 3, Item (56), Please insert -- 5,022,384  6/1991 Freels --.

On Title Page 3, Item (56), Please insert -- 4,885,565  12/1989 Embach --.

On Title Page 3, Item (56), Please insert -- 4,484,191  11/1984 Vavra --.

On Title Page 3, Item (56), Please insert -- 4,484,117  8/1984 Foerst --.

On Title Page 3, Item (56), Please insert -- 4,333,070  6/1982 Barnes --.

On Title Page 3, Item (56), Please insert -- 4,262,549  4/1981 Schwellenbach --.

On Title Page 3, Item (56), Please insert -- 4,127,752  11/1978 Lowthorp --.

Signed and Sealed this
Eleventh Day of October, 2011

David J. Kappos
*Director of the United States Patent and Trademark Office*

CERTIFICATE OF CORRECTION (continued)
U.S. Pat. No. 7,944,433 B2

On Title Page 3, Item (56), Please insert -- 2,972,140   2/1961 Hirsch --.

On Title Page 3, Item (56), Please insert -- 5,656,901   8/1997 Kurita --.

On Title Page 3, Item (56), Please insert -- 5,691,898   11/1997 Rosenberg et al. --.

On Title Page 3, Item (56), Please insert -- 5,704,791   1/1998 Gillio --.

On Title Page 3, Item (56), Please insert -- 5,754,023   5/1998 Roston et al. --.

On Title Page 3, Item (56), Please insert -- 5,755,577   5/1998 Gillio --.

On Title Page 3, Item (56), Please insert -- 5,769,640   7/1998 Jacobus et al. --.

On Title Page 3, Item (56), Please insert -- 5,784,052   7/1998 Keyson --.

On Title Page 3, Item (56), Please insert -- 5,821,920   10/1998 Rosenberg et al. --.

On Title Page 3, Item (56), Please insert -- 5,823,876   10/1998 Unbehand --.

On Title Page 3, Item (56), Please insert -- 5,880,714   3/1999 Rosenberg et al. --.

On Title Page 3, Item (56), Please insert -- 5,889,670   3/1999 Schuler et al. --.

On Title Page 3, Item (56), Please insert -- 5,944,151   8/1999 Jakobs et al. --.

On Title Page 3, Item (56), Please insert -- 6,037,927   3/2000 Rosenberg --.

On Title Page 3, Item (56), Please insert -- 6,048,727   4/2000 Rosenberg et al. --.

On Title Page 3, Item (56), Please insert -- 6,057,828   5/2000 Rosenberg et al. --.

On Title Page 3, Item (56), Please insert -- 5,334,027   8/1994 Wherlock --.

On Title Page 3, Item (56), Please insert -- 5,547,382   8/1996 Yamasaki --.

On Title Page 3, Item (56), Please insert -- 5,212,473   5/1993 Louis --.

On Title Page 3, Item (56), Please insert -- 5,466,213   11/1995 Hogan --.

On Title Page 3, Item (56), Please insert -- 5,766,016   6/1998 Sinclair --.

On Title Page 3, Item (56), Please insert -- 5,186,695   2/1993 Mangseth et al. --.

On Title Page 3, Item (56), Please insert -- 6,422,941   7/2002 Thorner et al. --.

On Title Page 3, Item (56), Line 42, Please delete "p.", please insert -- P. --.

On Title Page 3, Item (56), Line 56, Please delete "151", Please insert -- 1-51 --.

On Title Page 4, Item (56), Line 43, Please delete "lime", please insert -- Time --.

CERTIFICATE OF CORRECTION (continued)
U.S. Pat. No. 7,944,433 B2

On Title Page 5, Item (56), Line 25, Please delete "og", please insert -- of --.

On Title Page 5, Item (56), Line 27, Please delete "Addstein", please insert -- Adelstein --.

On Title Page 6, Item (56), Line 12, Please delete "WA11:00,", please insert -- WA11-11:00, --.

On Title Page 6, Item (56), Line 23, Please delete "Hlrota", please insert -- Hirota --.

Column 8, Line 54, Please delete "116a-and", please insert -- 116a and --.

Column 11, Line 26, Please delete "118", please insert -- 178 --.

Column 13, Line 52, Please delete "MDI", please insert -- MIDI --.

Column 16, Line 19, Please delete "228;", please insert -- 228. --.